(12) United States Patent
Sauder et al.

(10) Patent No.: US 9,961,822 B2
(45) Date of Patent: *May 8, 2018

(54) AGRICULTURAL TOOLBAR APPARATUS, SYSTEMS AND METHODS

(71) Applicant: Precision Planting LLC, Tremont, IL (US)

(72) Inventors: Gregg A. Sauder, Tremont, IL (US); Dale M. Koch, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/137,949

(22) Filed: Apr. 25, 2016

(65) Prior Publication Data

US 2016/0234993 A1 Aug. 18, 2016

Related U.S. Application Data

(63) Continuation of application No. 14/122,614, filed as application No. PCT/US2012/040756 on Jun. 4, 2012, now Pat. No. 9,320,190.

(60) Provisional application No. 61/493,158, filed on Jun. 3, 2011.

(51) Int. Cl.
*A01B 63/22* (2006.01)
*A01B 63/14* (2006.01)
*A01B 76/00* (2006.01)
*A01B 73/06* (2006.01)

(52) U.S. Cl.
CPC ............ *A01B 63/22* (2013.01); *A01B 63/145* (2013.01); *A01B 73/06* (2013.01); *A01B 73/065* (2013.01); *A01B 76/00* (2013.01)

(58) Field of Classification Search
CPC ....... A01B 63/22; A01B 63/145; A01B 73/06; A01B 76/00; A01B 73/065; A01B 63/111; A01B 63/114; A01B 63/32; A01B 73/00; A01B 73/02; A01B 73/067
USPC ... 172/1, 2, 4, 311, 452, 481, 318, 456, 140, 172/236–238, 272, 321–324; 280/414.5; 701/50
See application file for complete search history.

(56) References Cited

U.S. PATENT DOCUMENTS

| | | | | |
|---|---|---|---|---|
| 3,240,508 A * | 3/1966 | Clausen | ................... | A01C 9/00 172/310 |
| 3,613,798 A * | 10/1971 | Mohan | ................ | A01B 63/1117 137/614.16 |
| 4,750,440 A * | 6/1988 | Pollard | ................... | A01B 35/12 111/151 |
| 4,858,698 A * | 8/1989 | Williamson | ....... | A01B 63/1145 172/439 |
| 5,363,924 A * | 11/1994 | Foley | ................... | A01B 63/145 172/326 |

(Continued)

*Primary Examiner* — Robert E Pezzuto
(74) *Attorney, Agent, or Firm* — Thomas J. Oppold; Larkin Hoffman Daly & Lindgren, Ltd.

(57) ABSTRACT

Systems, methods and apparatus for shifting weight between a tractor and toolbar and between sections of the toolbar, for controlling operative height of a toolbar and sections of a toolbar and for folding a toolbar between a work position and a transport position. A ground engaging wheel and an actuator are coupled to the toolbar. In one embodiment, a fluid control system is responsive to a command signal to modify the actuator pressure such that the actuator pressure corresponds to a desired pressure.

17 Claims, 39 Drawing Sheets

(56) References Cited

U.S. PATENT DOCUMENTS

| | | | | |
|---|---|---|---|---|
| 5,653,292 A * | 8/1997 | Ptacek | ............... | A01B 63/114 |
| | | | | 172/239 |
| 6,068,064 A * | 5/2000 | Bettin | ................ | A01B 63/32 |
| | | | | 172/413 |
| 6,112,827 A * | 9/2000 | Reiber | ............... | A01B 63/32 |
| | | | | 172/311 |
| 6,534,728 B1 * | 3/2003 | Spikings | ............ | A01B 59/069 |
| | | | | 111/903 |
| 8,727,032 B2 * | 5/2014 | Friggstad | ............ | A01B 73/065 |
| | | | | 172/311 |
| 8,863,857 B2 * | 10/2014 | Bassett | ............... | A01C 7/205 |
| | | | | 111/136 |

* cited by examiner

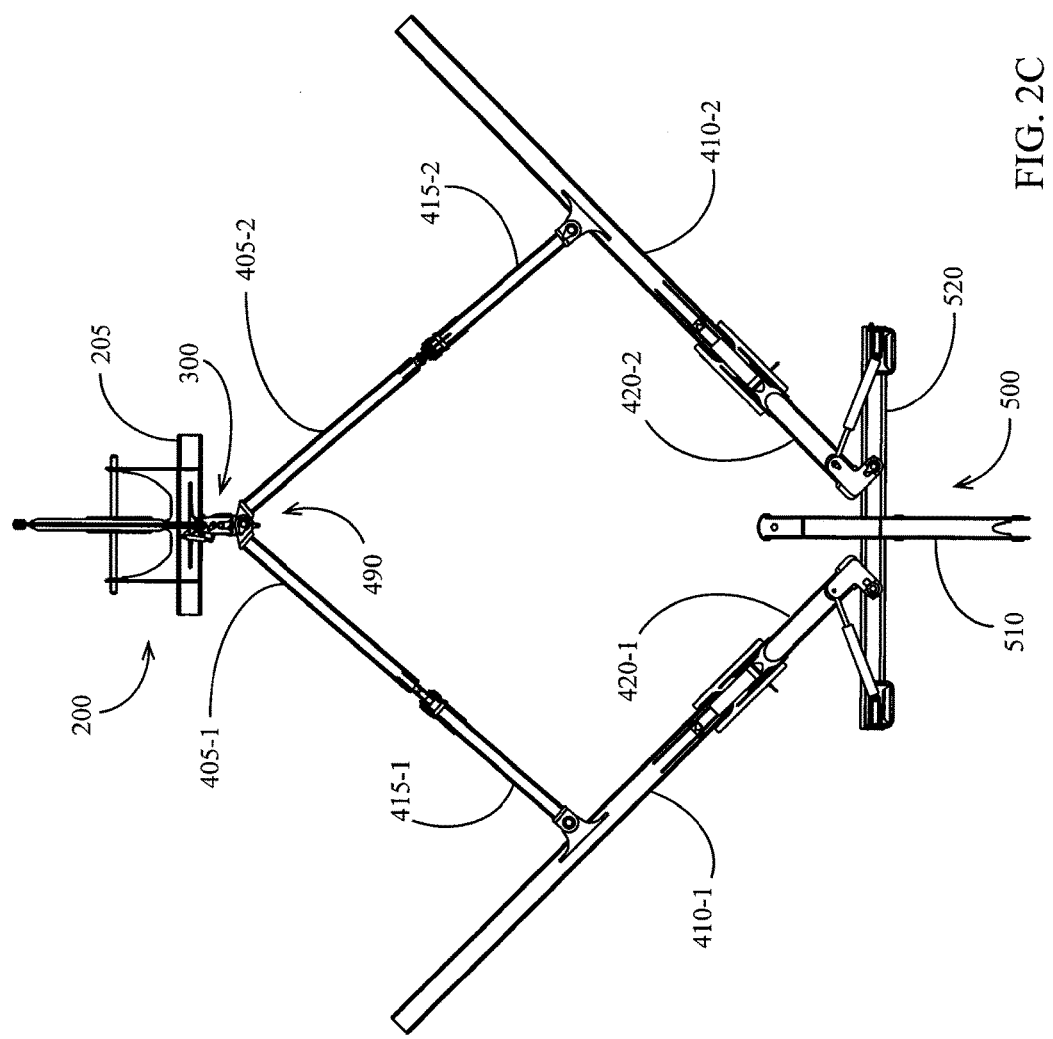

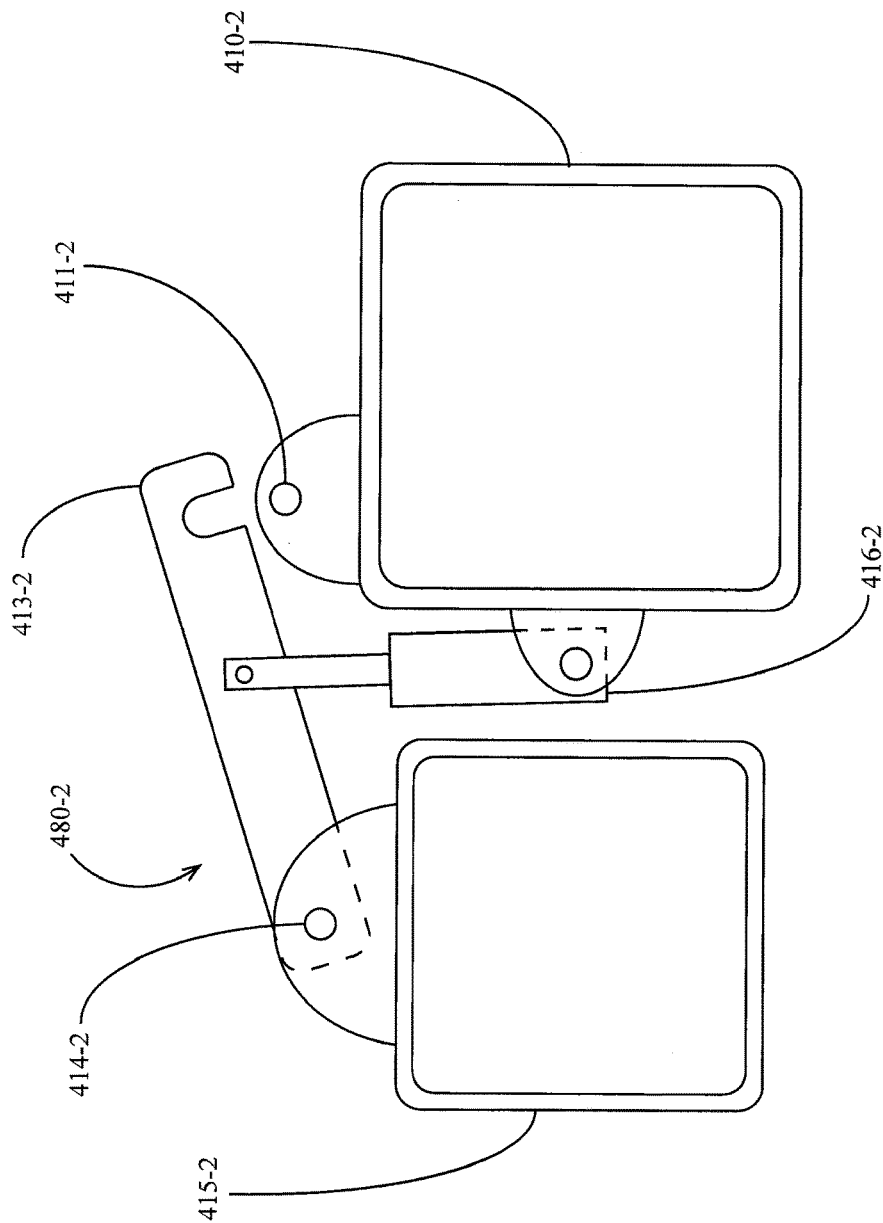

| Scenario Number | Section Average | | | Action(s) | Stop condition(s) |
|---|---|---|---|---|---|
| | Left | Center | Right | | |
| 1 | High | High | High | Retract mount cylinder | Center section average is good |
| 2 | Good | Good | High | Retract right cylinder | Right section average is good |
| 3 | Good | High | Good | Retract mount cylinder | Center section average is good |
| 4 | High | Good | Good | Retract left cylinder | Left section average is good |
| 5 | High | High | Low | Retract mount cylinder | Center section average is good |
| 6 | Good | High | Good | Extend right cylinder | Right section average is good |
| 7 | Low | High | Low | Extend left cylinder | Left section average is good |
| 8 | Low | Good | High | Extend right cylinder | Right section average is good |
| 9 | High | Good | Low | Extend left cylinder | Left section average is good |
| 10 | High | Good | Low | Retract right cylinder | Right section average is good |
| 11 | Low | Good | High | Extend left cylinder | Left section average is good |
| 12 | Good | High | High | Retract left cylinder | Left section average is good |
| | | | | Extend right cylinder | Right section average is good |
| | | | | Retract mount cylinder | Center section is good |

FIG. 20

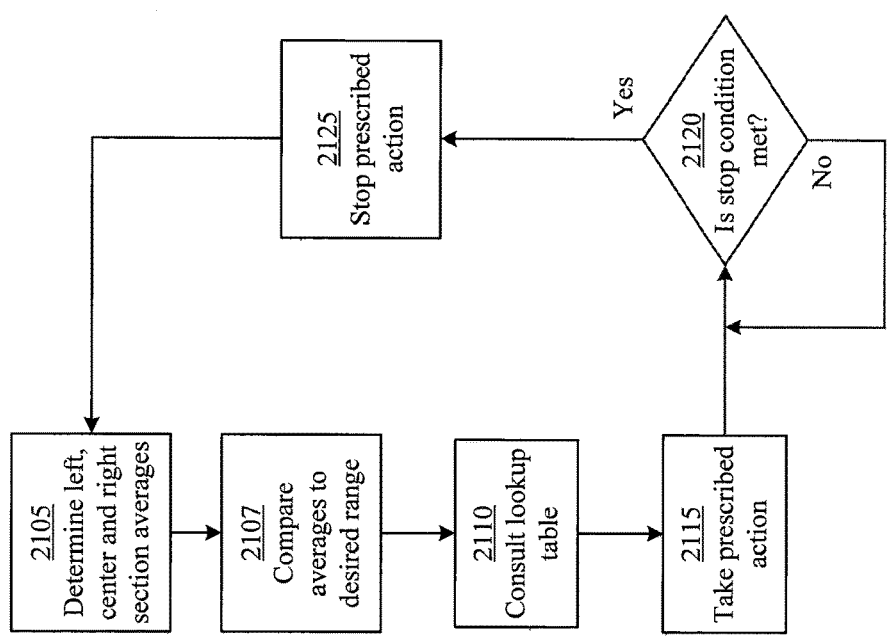

AGRICULTURAL TOOLBAR APPARATUS, SYSTEMS AND METHODS

CROSS-REFERENCE TO RELATED APPLICATIONS

This is a continuation of U.S. application Ser. No. 14/122,614, filed Nov. 26, 2013, which is a National Stage of International Application No. PCT/US2012/040756, filed Jun. 4, 2012 which claims the benefit of U.S. Provisional Application No. 61/493,158, filed Jun. 3, 2011.

BACKGROUND

Agricultural toolbars such as planters have become larger and heavier as farming operations have become larger. Thus growers have increasingly recognized the potential to improve yield by reducing compaction damage by such toolbars. As a result, there is a need in the art for systems, apparatus and methods of shifting weight between the toolbar and the tractor and between sections of the toolbar in order to reduce agronomic damage from compaction. Additionally, the time pressure in performing planting operations has created a need in the art for effective and efficient systems, apparatus and methods of folding agricultural toolbars between field position and a planting position, and especially for toolbars having a field position in which turns and changes in topography are effectively negotiated.

BRIEF DESCRIPTION OF THE DRAWINGS

FIG. 2C is a top view of the toolbar of FIG. 1A in an intermediate position.

FIG. 10 is a rear elevation view of the transport latch of the toolbar of FIG. 1A.

FIG. 20 illustrates an embodiment of a toolbar height control lookup table.

FIG. 21 illustrates another embodiment of a process for controlling the height of a toolbar.

DESCRIPTION

Figure 1A:
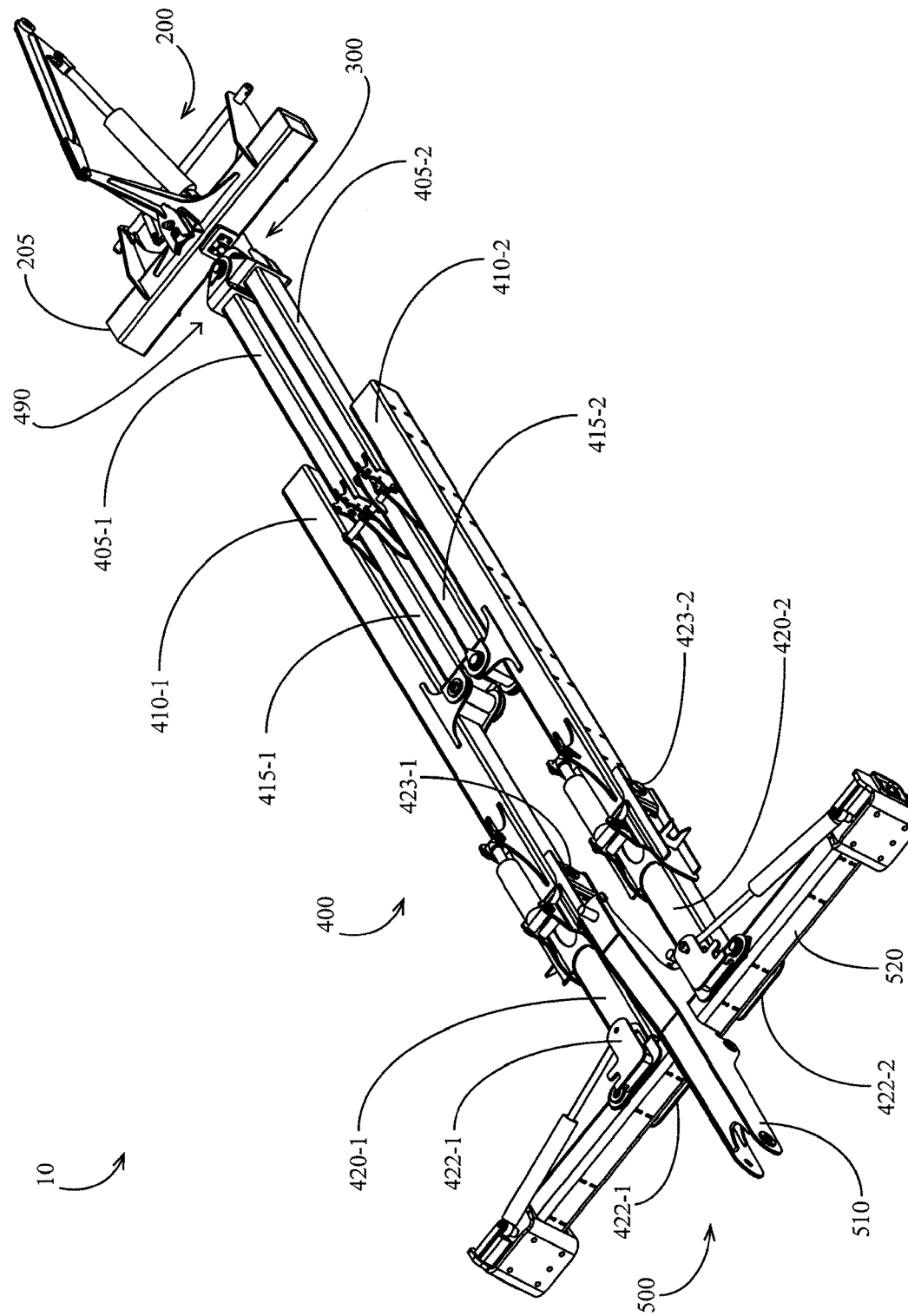
FIG. 1A is a generally rearward perspective view of an embodiment of a toolbar in a transport position.
Figure 1B:
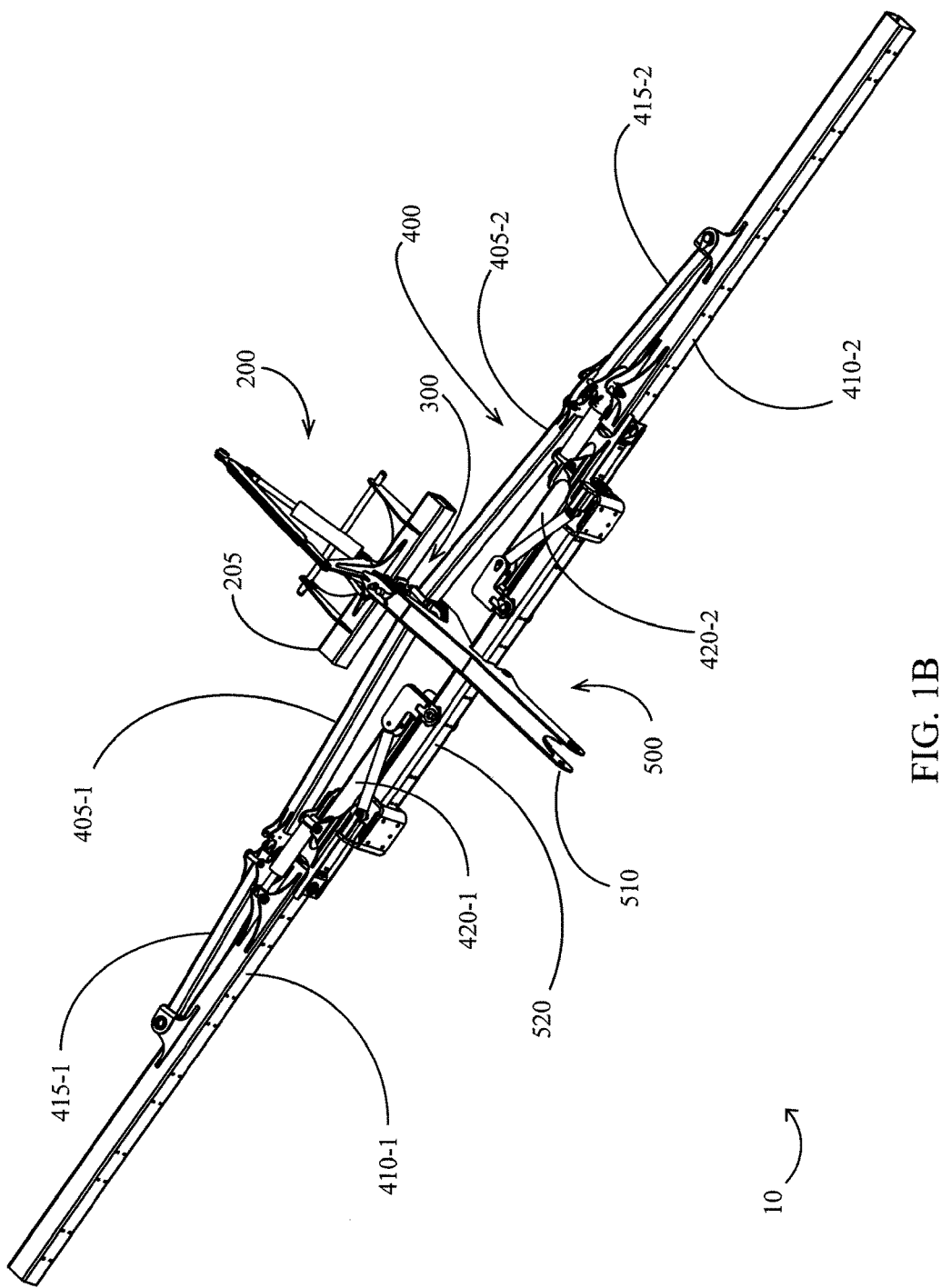
FIG. 1B is a generally rearward perspective view of the toolbar of FIG. 1A in a work position.
Figure 1C:
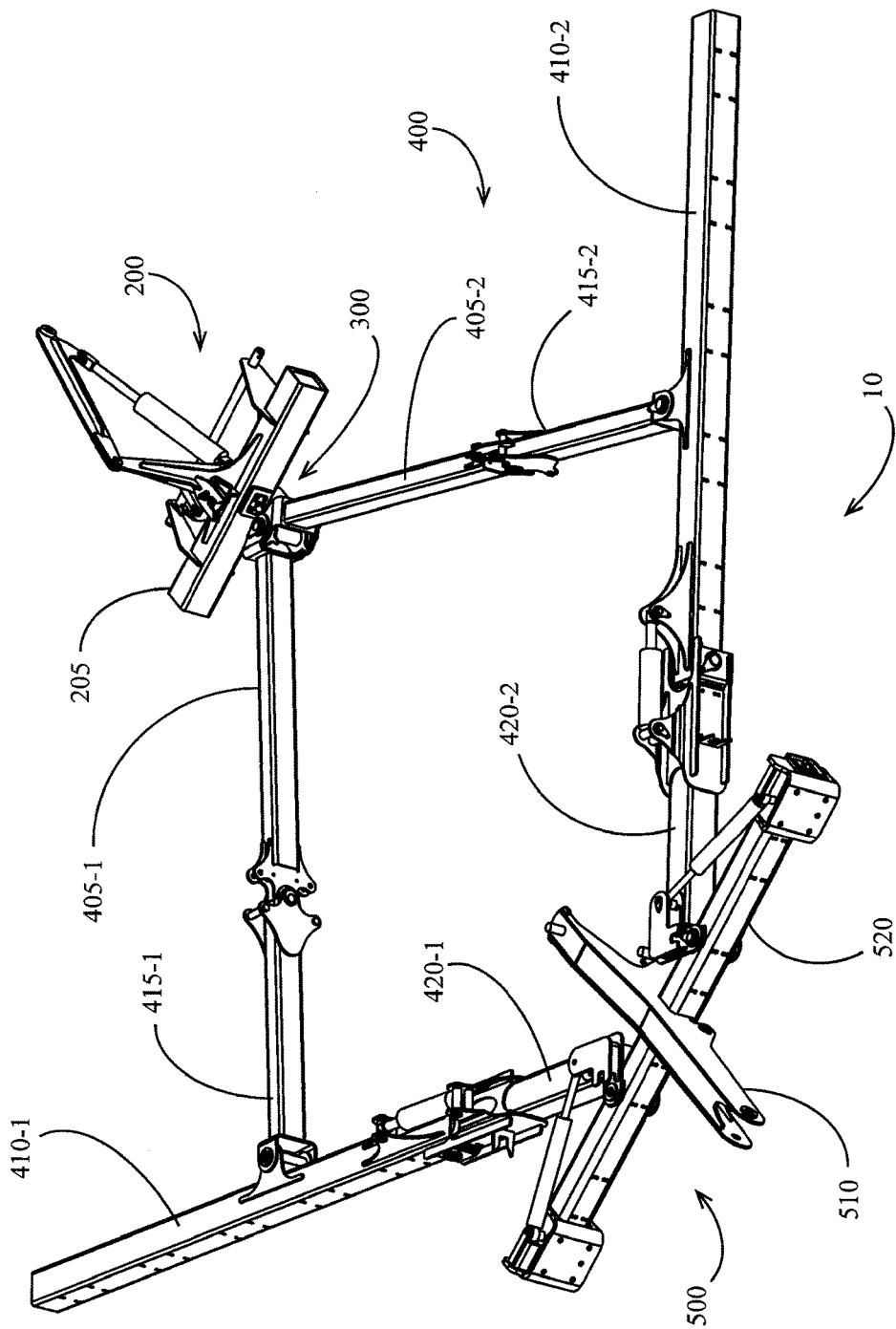
FIG. 1C is a generally rearward perspective view of the toolbar of FIG. 1A in an intermediate position.

Referring now to the drawings, wherein like reference numerals designate identical or corresponding parts throughout the several views, FIGS. 1A and 1B are perspective views of an agricultural toolbar 10 in a transport position and a work position, respectively. FIG. 1C is a perspective view of an intermediate position between the work and transport positions. Toolbar 10 includes a mount 200, a folding frame 400, and a rear section 500. Mount 200 is attached to a tractor or other draft vehicle. In the work position, rear section 500 is attached to the mount 200 by a work hitch 300. In the transport position, the folding frame 400 is attached to the mount 200 at a transport hitch 490. In operation, the toolbar 10 is moved from the transport position to the work position by collapsing the folding frame 400 and attaching the rear section 500 to the work hitch 300. The toolbar 10 is moved from the work position to the transport position by detaching the rear section 500 from the work hitch 300 and unfolding the folding frame 400. Comparing FIGS. 1A and 1B, it should be appreciated that in the transport position, the transverse profile of toolbar 10 is substantially narrower than in the work position. The greatest transverse width of the toolbar 10 in the transport position, including any attached tools, is preferably within the allowable width permitted by applicable regulations for over-the-road transport.

Ground-engaging Tools and Wheels

Figure 5A:
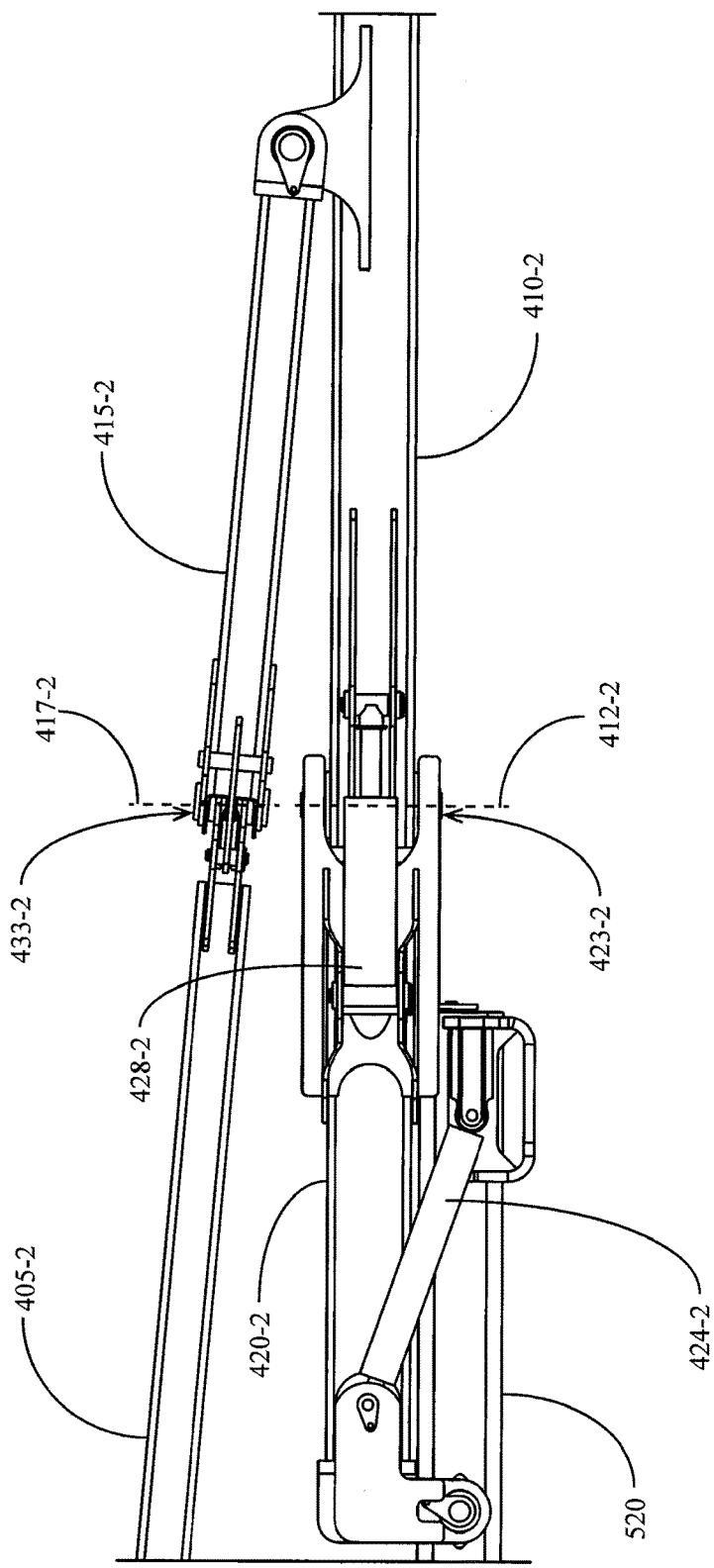
FIG. 5A is a partial top view of the folding frame of the toolbar of FIG. 1A.
Figure 5B:
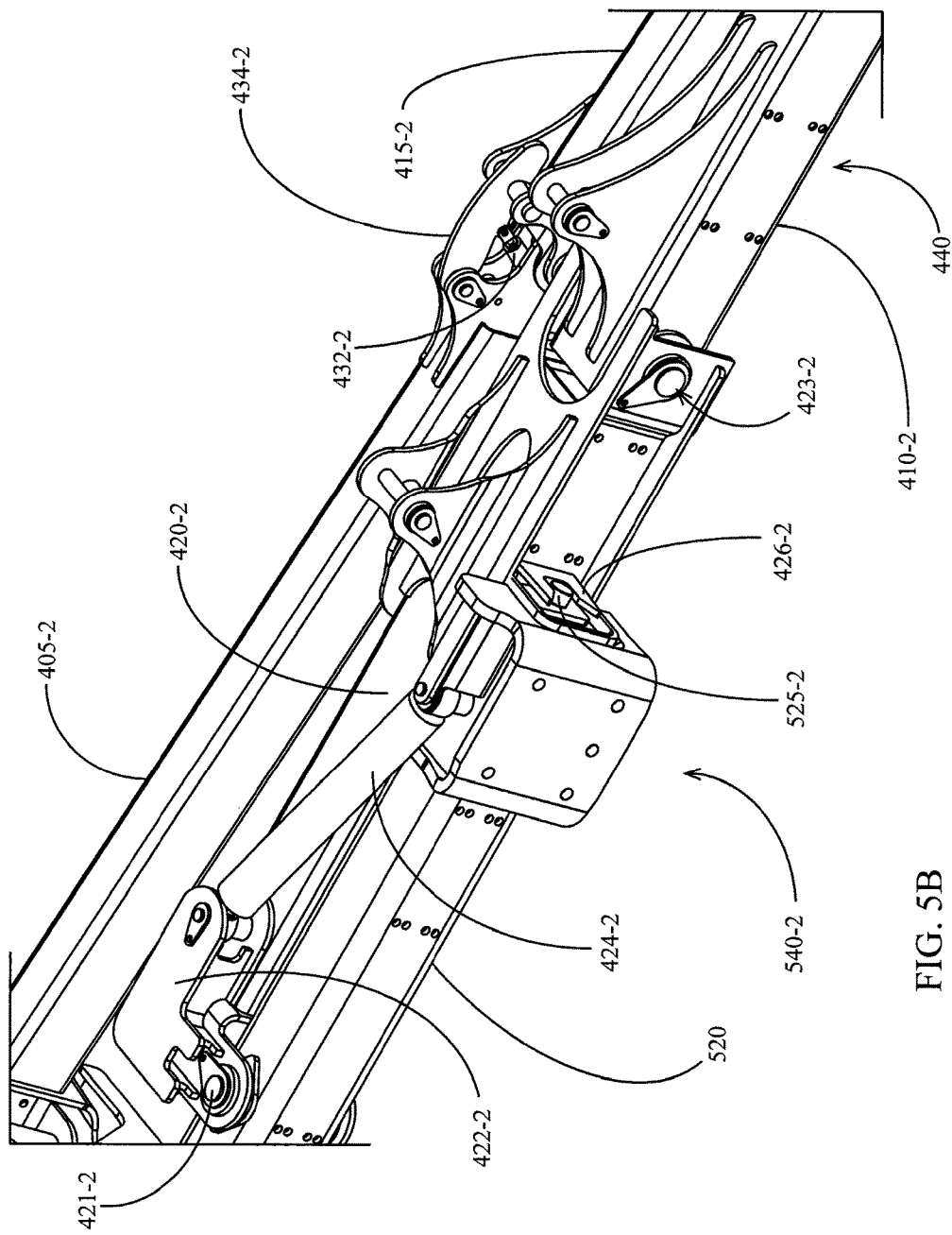
FIG. 5B is a generally rearward partial perspective view of the folding frame of the toolbar of FIG. 1A.

As best illustrated in FIG. 5B, tools may be fixed to a center bar 520 of the rear section 500 and to wing sections 410 of the folding frame 400 by mounting hole arrangements 440, or by U-bolts or other mounting structure known in the art. The tools may comprise planter row units (such as disclosed in FIG. 1 of Applicant's co-pending U.S. patent application Ser. No. 12/679,710, the disclosure of which is hereby incorporated herein in its entirety by reference), seed drill row units, soil tillage tools, or other crop input units or ground-working tools known in the art. Lift-assist wheel assemblies 1500 (not shown in FIG. 5B, functionally similar to the lift-assist wheel assembly 1500 illustrated in FIG. 15) are preferably mounted to mounting brackets 540 mounted to the center bar 520. Mounting brackets 540 preferably include mounting hole arrangements for the installation of the lift assist wheel assemblies. Wing wheel assemblies (not shown) such as those generally designated by reference numerals 56 and 60 in U.S. Pat. No. 7,469,648, the disclosure of which is hereby incorporated herein in its entirety by reference, may also be mounted at mounting hole arrangements 440 at or near the outboard ends of wing sections 410. It should be appreciated that in some embodiments and operating modes, such tools and wheels engage the ground, imposing generally vertical loads on the center bar 520 and the wing sections 410.

Lift assist wheels 1550 (FIG. 15) may be mounted in a castering fashion (as illustrated in U.S. Pat. No. 4,026,365, the disclosure of which is incorporated herein in its entirety by reference) such that each lift assist wheel may pivot about a generally vertical axis during operation. It should be appreciated in light of this disclosure that such castering lift assist wheels 1550 permit turning of the toolbar 10 around smaller radii.

Toolbar Components

Figure 2A:
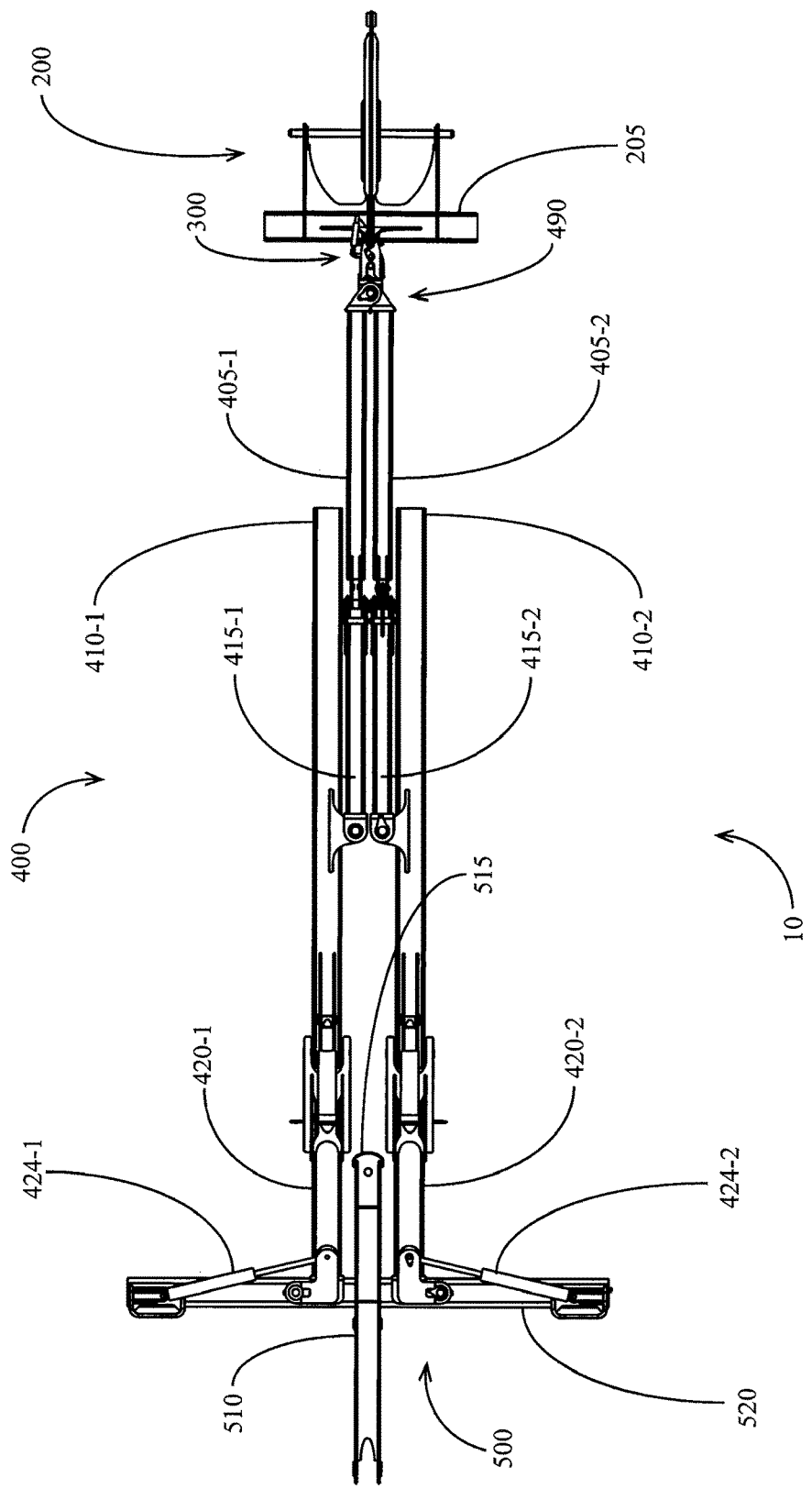
FIG. 2A is a top view of the toolbar of FIG. 1A in a transport position.
Figure 2B:
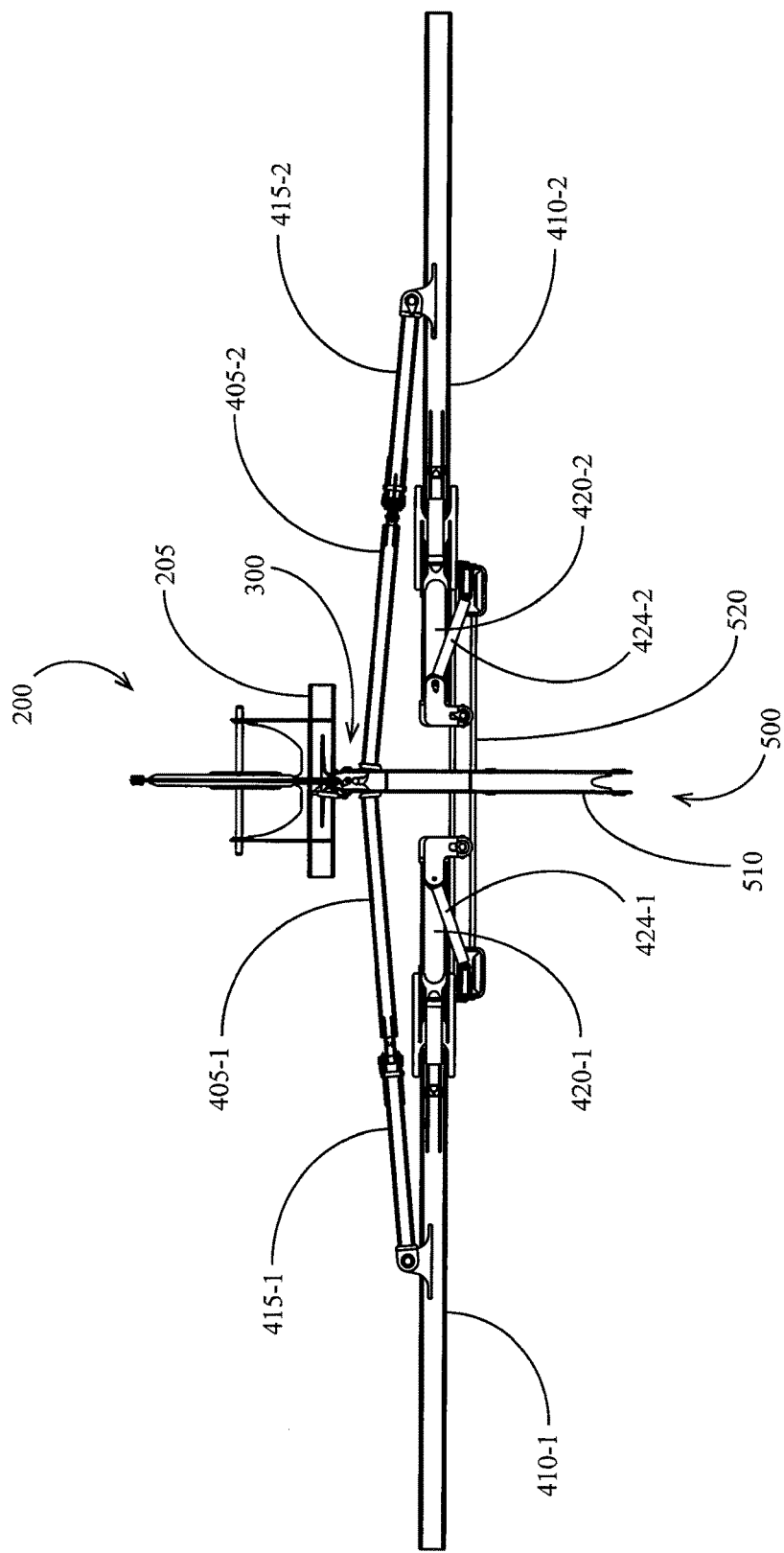
FIG. 2B is a top view of the toolbar of FIG. 1A in a work position.

Referring to FIGS. 2A and 2B, the toolbar 10 is illustrated from a top view in its transport position and working position, respectively. FIG. 2C is a top view of the toolbar 10 in an intermediate position between the transport and working positions. Folding frame 400 includes transport hitch 490, inboard draft bars 405, outboard draft bars 415, the wing sections 410 and pivot bars 420. The inboard draft bars 405 are pivotally mounted to the transport hitch 490 for pivoting about a generally vertical axis. The outboard draft bars 415 are pivotally mounted at a first end to the inboard draft bars 405 for pivoting about a generally horizontal axis. Relative pivoting of the draft bars 405,415 is preferably selectively lockable as described later herein. The outboard draft bars 415 are pivotally mounted at a second end to wing sections 410 for pivoting about a generally vertical axis. Wing sections 410 are pivotally mounted to pivot bars 420 for pivoting about a generally horizontal axis. The rear section 500 includes the center bar 520, to which the pivot bars 420 of the folding frame 400 are pivotally mounted for pivoting about a generally vertical axis. In operation, the folding frame 400 is preferably reconfigured from the transport position to the work position by pivoting the wing sections 410 and the draft bars 405,415 in an outboard direction until the wing sections are in substantially parallel or near-parallel alignment along a direction substantially transverse to the direction of travel. The folding frame 400 is preferably unfolded from the work position to the transport position by pivoting the wing sections 410 and the draft bars 405,415 in an inboard direction until the wing sections are in generally parallel or near-parallel alignment along a direction substantially parallel to the direction of travel.

Wing fold cylinders 424 are pivotally mounted at a first end to center bar 520 and at a second end to pivot bar 420. Wing fold cylinders 424 are preferably dual-acting hydraulic cylinders capable of collapsing and unfolding the folding frame 400 as described herein by pivoting the wing sections 410 relative to center bar 520. The fluid control system 1330 preferably controls the wing fold cylinders 424 in a flow control mode, e.g., using a flow control valve 1334 incorporated in the fluid control system 1330.

It should be appreciated that where the toolbar 10 includes substantially equivalent or mirror-image left- and right-hand components, the left-hand components generally correspond to a reference numeral with the suffix "–1" and the right-hand components generally correspond to the same reference numeral with the suffix "–2." Both the left- and right-hand components may be collectively referenced herein by the reference numeral without either suffix.

Folding Frame Components

Figure 9A:
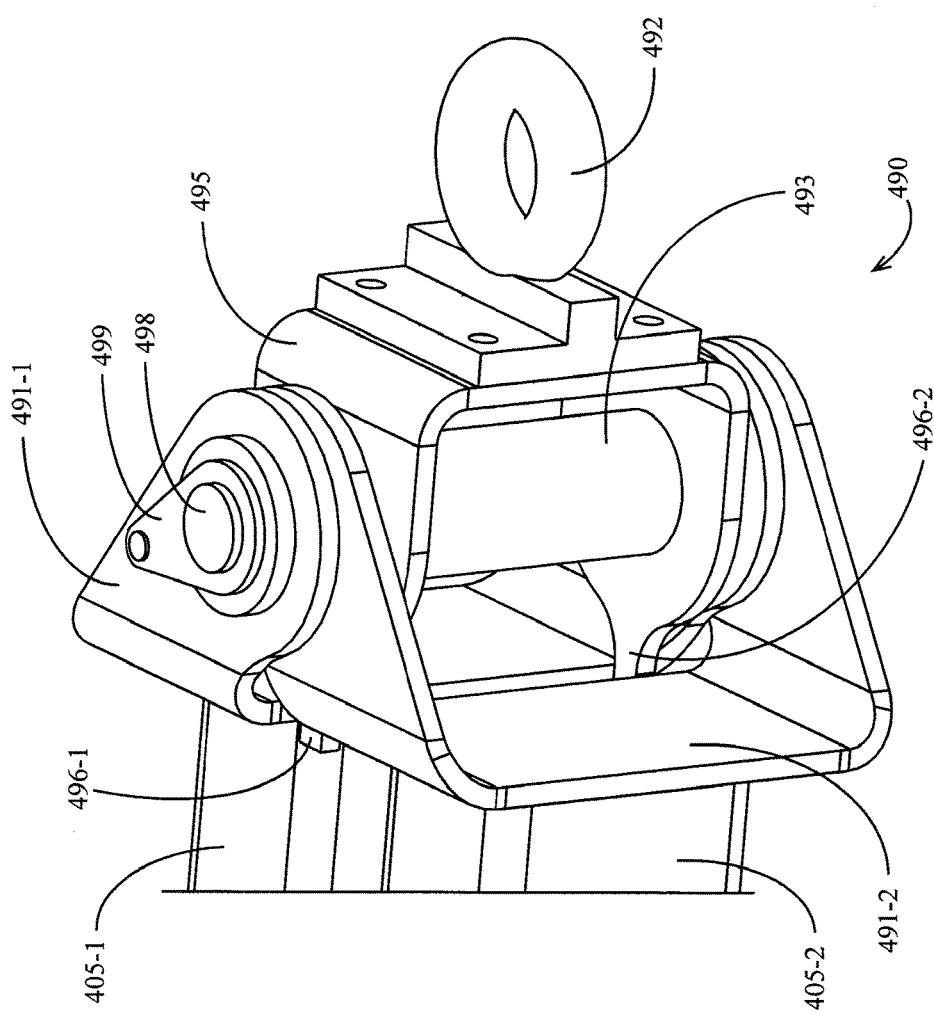
FIG. 9A is a perspective view of the transport hitch of the toolbar of FIG. 1A.
Figure 9B:
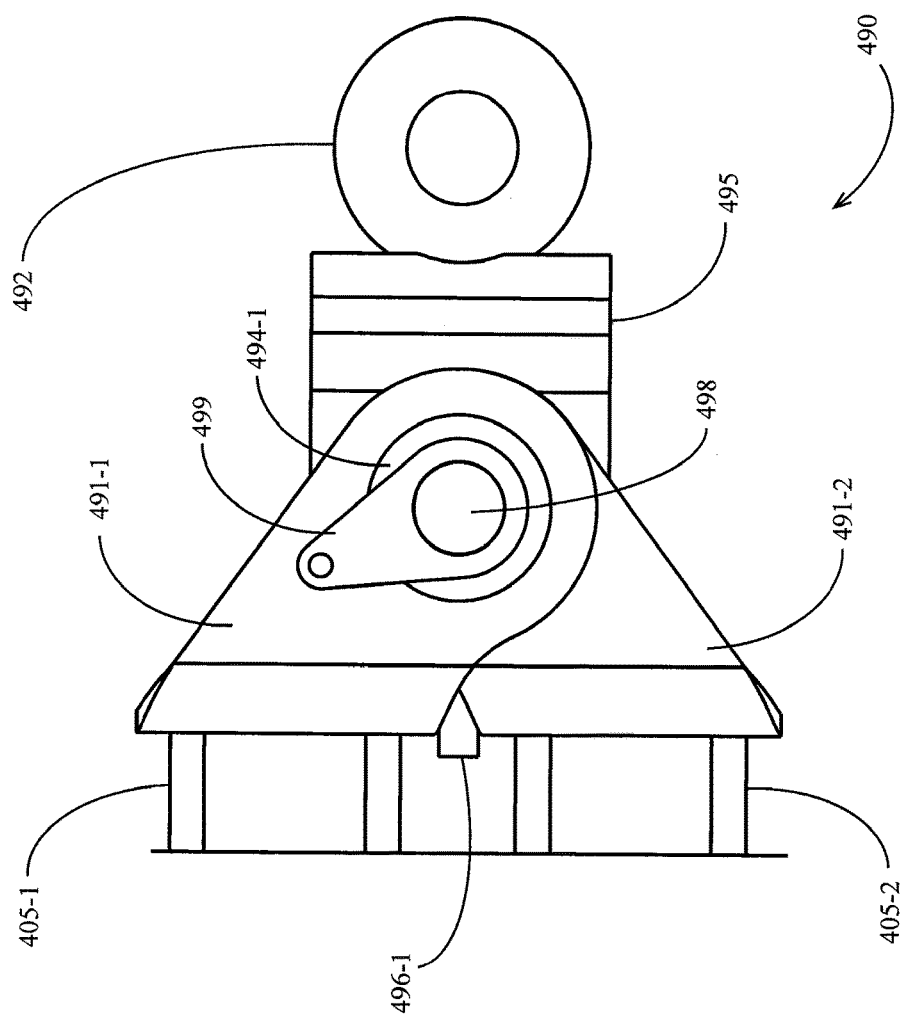
FIG. 9B is a top view of the transport hitch of the toolbar of FIG. 1A.
Figure 9C:
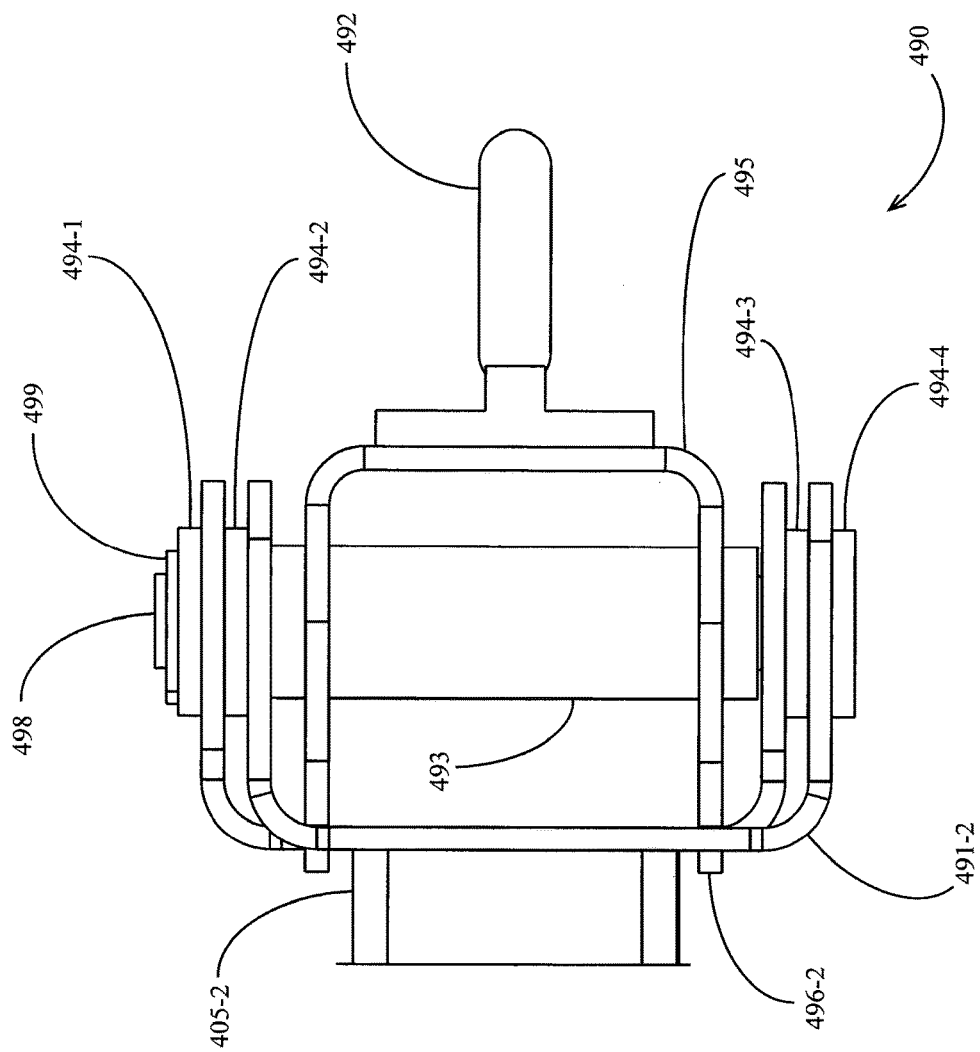
FIG. 9C is a side elevation view of the transport hitch of the toolbar of FIG. 1A.

The transport hitch 490 is illustrated in more detail in FIGS. 9A-9C. Each inboard draft bar 405 is mounted to a respective clevis 491. The devises 491 are both pivotally coupled to a pin 498. Pin 498 is rotatably housed within an inner surface of a pin boss 493. A hitch bar 495 is pivotally coupled to an outer surface of the pin boss 493. Specifically, the hitch bar 495 preferably includes upper and lower surfaces having apertures that pivotally engage the pin boss 493. The upper and lower surfaces of hitch bar 495 also include tips 496 which extend between the devises 491, limiting the relative rotation of the inboard draft bars 405 to the extreme position best viewed in FIG. 9B. Bosses 494 are mounted to the pin 498 and hold the devises 491 in vertically spaced relation. A pin flag 499 is preferably mounted to an upper surface of pin 498 and attached to clevis 491-1, preventing pin 498 from rotating relative to clevis 491-1. A lunette ring 492 is mounted to hitch bar 495.

Figure 3A:
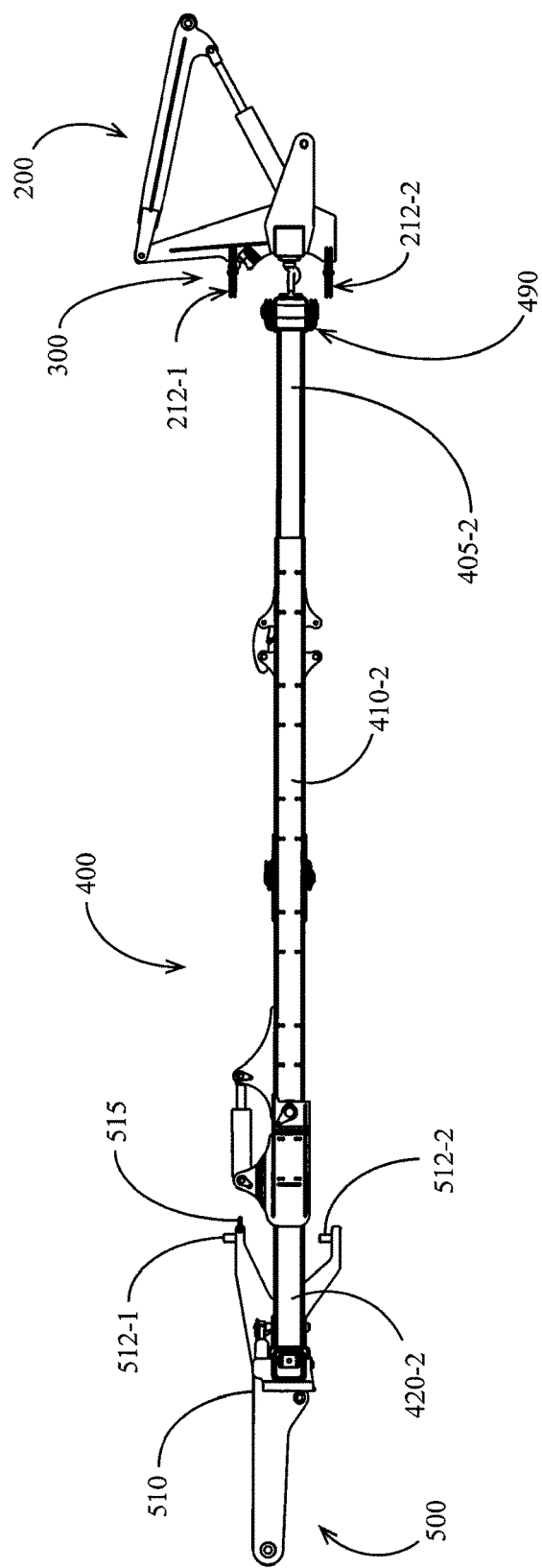
FIG. 3A is a side elevation view of the toolbar FIG. 1A in a transport position.
Figure 3B:
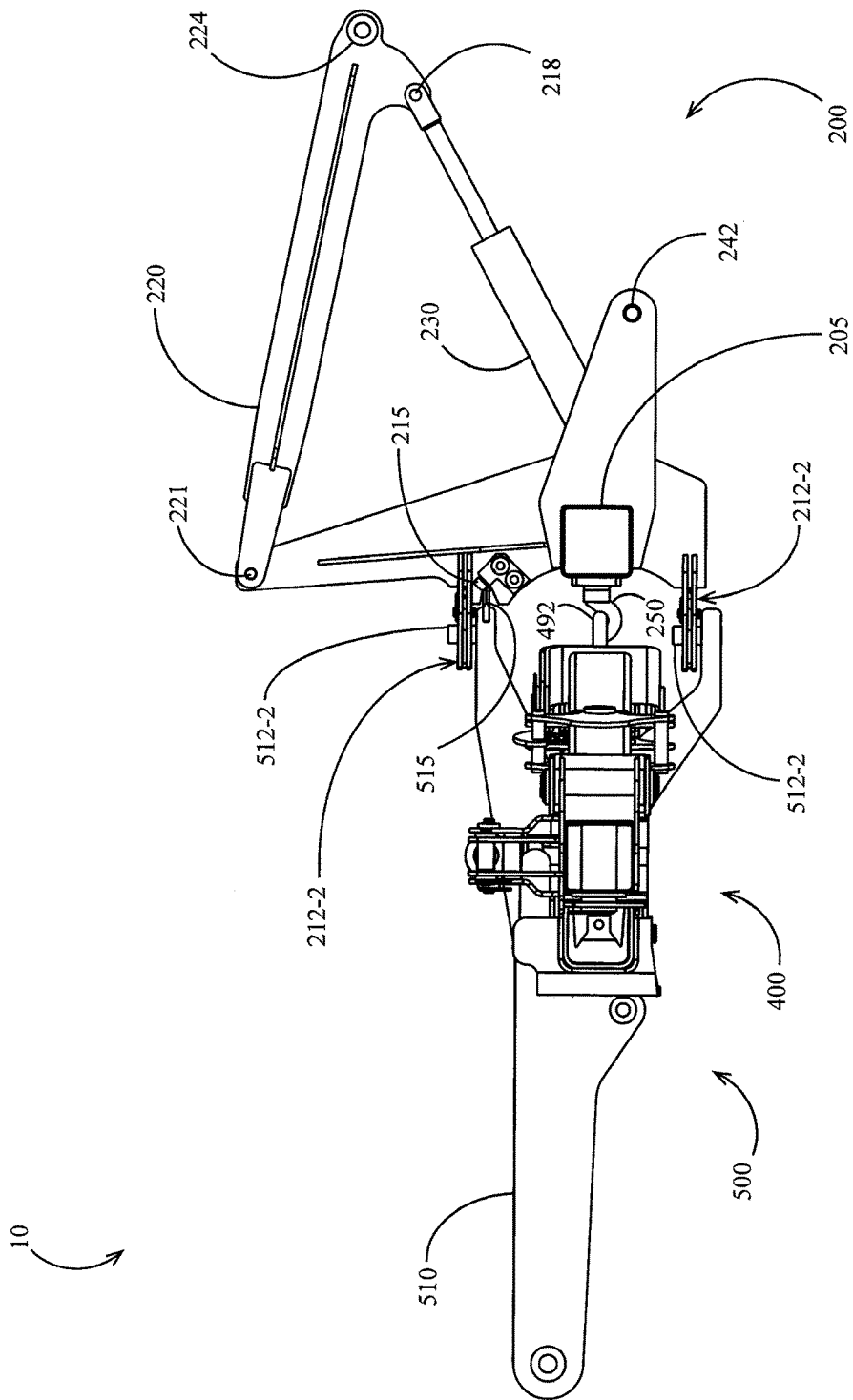
FIG. 3B is a side elevation view of the toolbar of FIG. 1A in a work position.

As best viewed in FIGS. 3A and 3B, lunette ring 492 engages a pintle hitch 250, which is mounted to the mount 200. Thus in the transport position, mount 200 draws the toolbar 10 by the lunette ring 492. It should be appreciated that in the transport position, the coupling between the pintle hitch 250 and lunette ring 492 allows pivoting between the mount 200 and the folding frame 400 about a generally vertical axis, but also allows the mount and folding frame to pivot relative to one another about a generally horizontal axis.

The right-hand components of the foldable frame 400 are illustrated in more detail in the work position in FIGS. 5A and 5B. The inboard draft bar 405 and outboard draft bar 415 are joined at a joint 433. Joint 433 constrains the draft bars 405,415 to pivot relative to one another about a substantially horizontal axis 417. The pivot bar 420 and the wing section 410 are joined at a joint 423. The joint 423 constrains the wing section 410 and the pivot bar 420 to pivot relative to one another about a substantially horizontal axis 412. Axis 417 and axis 412 are preferably substantially parallel to one another. Moreover, axis 417 and axis 412 are preferably substantially collinear with one another. Because axes 417, 412 are substantially collinear, the wing section 410 is allowed to pivot about joint 423 in the work position without interference. Thus as the toolbar 10 traverses the field, the wing section 410 may be raised or lowered relative to center bar 520 in response to changes in terrain.

Figure 8A:
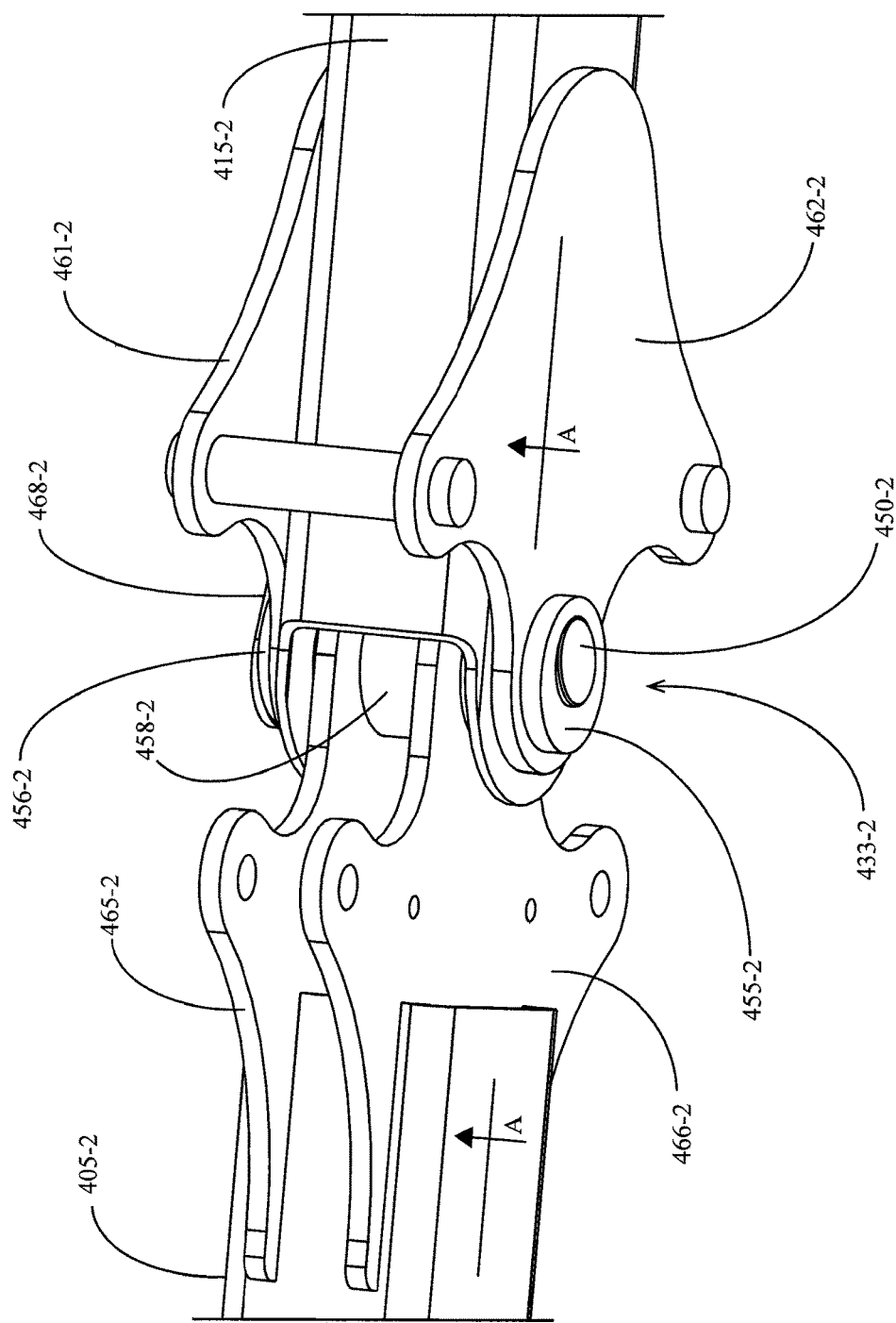
FIG. 8A is a partial perspective view of the folding frame joint of the toolbar of FIG. 1A.
Figure 8B:
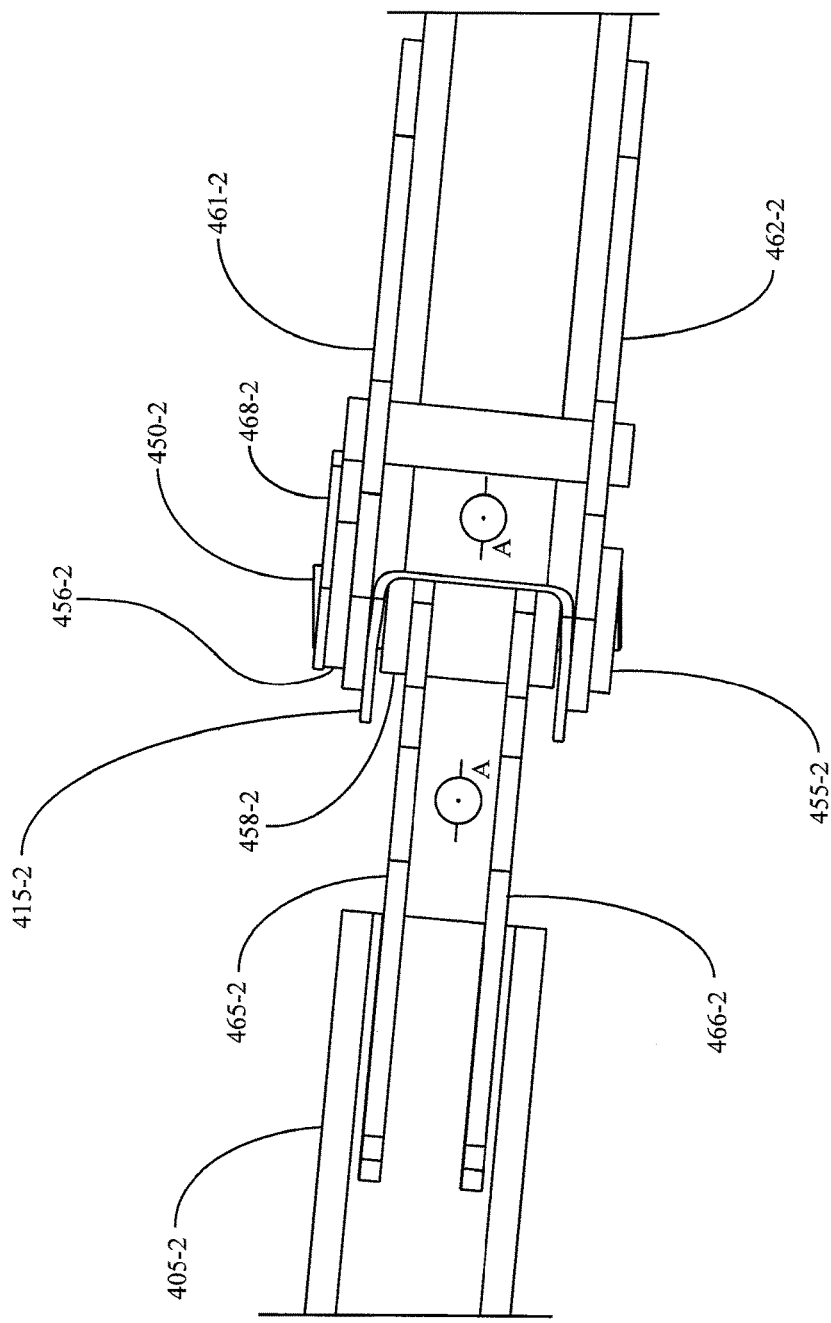
FIG. 8B is a partial top view of the folding frame joint of the toolbar of FIG. 1A.
Figure 8C:
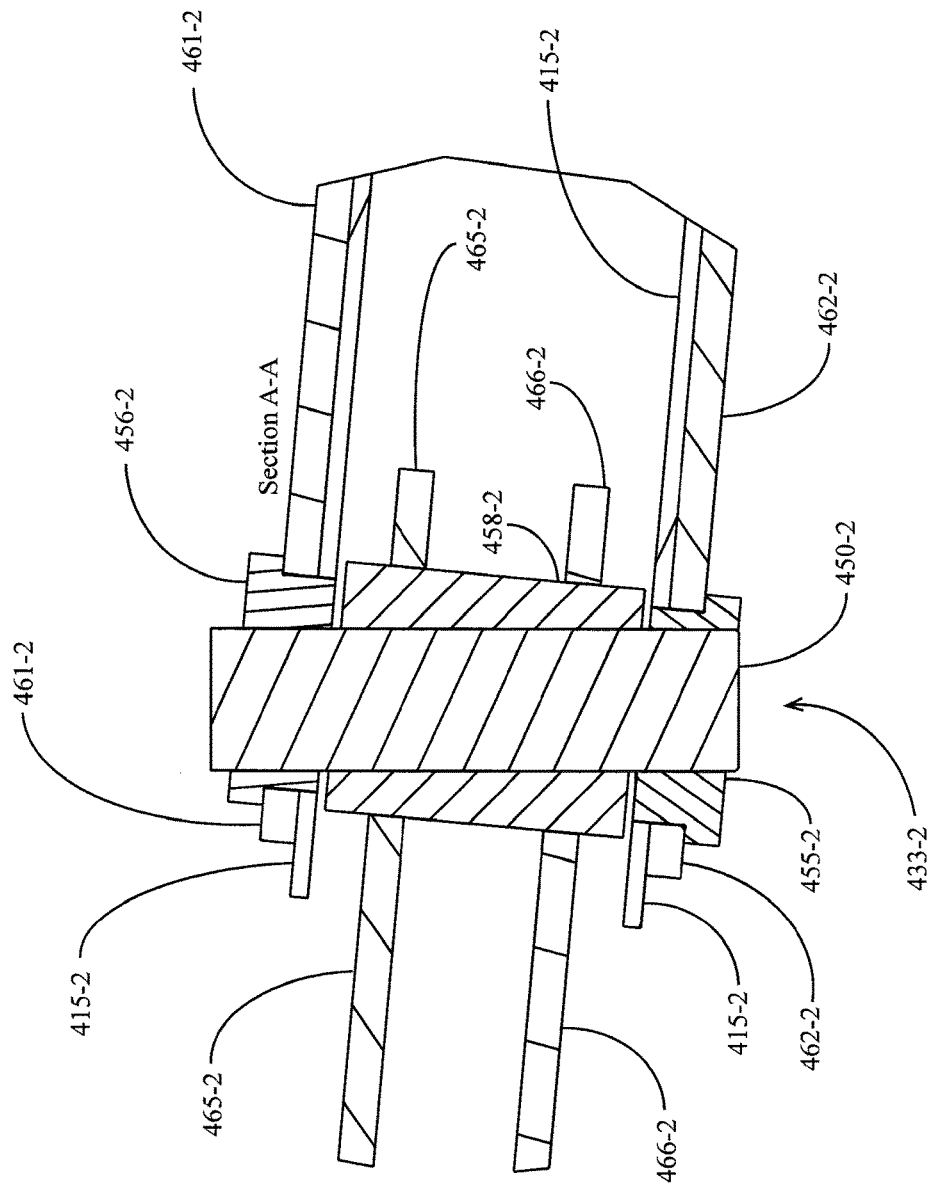
FIG. 8C is a partial cross-sectional view of the folding frame joint of the toolbar of FIG. 1A along the section A-A indicated in FIGS. 8A and 8B.

Joint 433 is illustrated in more detail in FIGS. 8A-8C, in which a latch hook 434 and an actuator 432 (both described herein with respect to FIG. 5B) are not shown for clarity. As best seen in the cross-sectional view of FIG. 8C, joint 433 includes a pin 450, an inboard boss 458, and outboard bosses 455,456. Pin 450 is pivotally mounted within bosses 455, 456,458. Inboard draft bar 405 includes hinge plates 465, 466 which are preferably pivotally coupled to inboard boss 458. Outboard draft bar 415 is coupled to outboard bosses 455,456. Outboard draft bar 415 also includes hinge plates 461,462 which are coupled to the outboard bosses 456,455, respectively. A pin flag 468 is preferably mounted to one end of pin 450 and to hinge plate 461, preventing pin 450 from rotating relative to outboard draft bar 415.

It should be appreciated that pin 450 defines the axis 417 illustrated in FIG. 5A. Thus it is the orientation and position of pin 450 with respect to axis 412 that allows the outboard draft bar 415 and the wing section 410 to pivot simultaneously without interference. For example, if embodiments in which draft bars 405,415 are substantially parallel with wing section 410 and pivot bar 420 in the work position, pin 450 is preferably substantially co-axial with bosses 455,456,458.

When toolbar 10 is in the transport position or reconfiguring from the work position to the transport position, joints 423 or joints 433 are preferably locked to prevent the folding frame 400 from collapsing. Joint 423 may be locked by preventing extension or retraction of an actuator 428, described elsewhere herein, using an external locking mechanism (not shown). Joint 433 is preferably locked using latch hook 434 (best seen in FIG. 5B, in which actuator 428 is not shown for clarity). Latch hook 434 is pivotally mounted to the inboard draft bar 405 and releasably latches outboard draft bar 415. In transport, the latch hook 434 is generally in compression preventing joint 433 from moving downward. However, if loads acting on joint 433 bias joint 433 upward, the latch hook 434 is placed in tension. Latch hook 434 is preferably selectively engaged and disengaged using an actuator 432. Actuator 432 is pivotally mounted at a first end to the inboard draft bar 405 and at a second end to the latch hook 434. Actuator 434 is preferably a dual-acting hydraulic cylinder. Extension of the actuator 432 disengages the latch hook 434, allowing the draft bars 405,415 to pivot relative to one another. Retraction of the actuator 432 engages the latch hook 434, preventing the draft bars 405,415 from pivoting relative to one another.

Continuing to refer to FIG. 5B, pivot bar 420 is pivotally mounted to center bar 520 by a clevis 422. Clevis 422 is mounted to center bar 520 at a pin 421. Pin 421 constrains the pivot bar 420 to rotate with respect to center bar 520 about a substantially vertical axis. As illustrated in FIGS. 1A and 2A, in the transport position, clevis 422 engages center bar 520 such that the pivot bars 420 do not pivot relative to center bar 520.

It should be appreciated that relatively large stresses may be imposed on pin 421 as varying vertical loads are imposed on center bar 520 and pivot bar 420. Thus the toolbar 10 preferably includes features that partially relieve these stresses from the pin 421. In the work position, referring to FIG. 5B, pivot bar 420 preferably includes a stop pocket 426 and center section 520 preferably includes a roller 525. When reconfiguring from the transport position to the work position, the roller 525 preferably engages the stop pocket 426. Stop pocket 426 preferably includes upper and lower chamfered surfaces to guide the roller 525 into the stop pocket. If the center bar and pivot bar pivot vertically relative to one another beyond a threshold amount, the roller 525 contacts the stop pocket 426 such that a portion of the deflection load shifts to the stop pocket and roller, reducing the load on the pin 421. In the transport position, as best seen in FIG. 1A, each clevis 422 preferably engages the center bar 520 such that the load required to maintain the relative position of the pivot bar 420 and the center bar is shared between the pin 421 and the clevis.

In the work position, center bar 520 and wing section 410 may be pivoted about joint 423 using an actuator 428. Actuator 428 is pivotally mounted at a proximal end to pivot bar 420 and at a distal end to wing section 410. Actuator 428 is preferably a dual-acting hydraulic cylinder. The fluid control system 1330 preferably controls the actuator 428 in a flow control mode, e.g., using a flow control valve 1334 incorporated in the fluid control system 1330. Thus the fluid control system is operable to modify the position (i.e., the degree of extension) of the wing section actuator 428. Extension of actuator 428 will pivot the wing section 410 downward relative to center bar 520. Likewise, retraction of actuator 428 will pivot the wing section 410 upward relative to center bar 520. It should be appreciated that the mounting positions of the head end and rod end of actuator 428 may be reversed in other embodiments.

Work Hitch

Figure 4A:
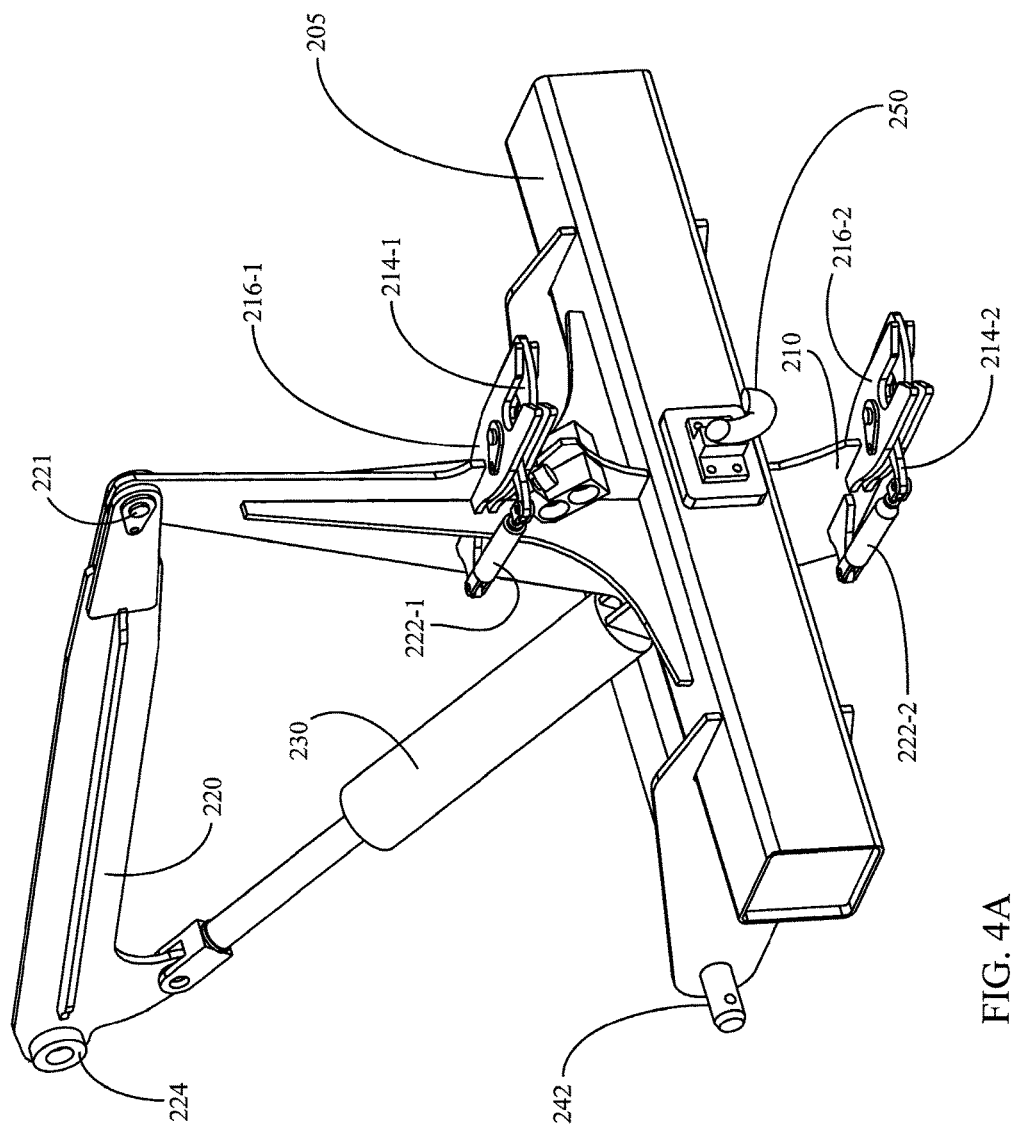
FIG. 4A is a generally rearward perspective view of an embodiment of a toolbar mount.

The work hitch 300 selectively retains the toolbar 10 in the work position. Referring to the transport and work position side views of FIGS. 3A and 3B, rear section 500 includes a saddle 510. Saddle 510 includes upper kingpin 512-1 and lower kingpin 512-2. Mount 200 includes upper kingpin latch 212-1 and lower kingpin latch 212-2. When the toolbar 10 reconfigures to the work position, the kingpin latches 212 preferably engage the kingpins 512. As best illustrated in the perspective view of FIG. 4A, each kingpin latch 212 includes a pair of pivot plates 216, each having a slot at a rearward end. A latch plate 214 is pivotally mounted between each pair of pivot plates 216. An actuator 222 is pivotally connected at a forward end to the mount 200 and pivotally connected at a rearward end to the latch plate 214. When the toolbar 10 reconfigures from the transport position to the work position, the kingpins 512 are received within the slots in pivot plates 216. Once toolbar 10 is fully in the work position, the actuators 222 preferably retract, rotating the latch plates 214 and securing the kingpins 512, thus retaining the toolbar 10 in the work position as the tractor moves forward. Before the toolbar 10 reconfigures from work position to the transport position, the actuators 222 preferably extend, rotating the latches 214 to allow the kingpins 512 to move rearwardly from the slots in pivot plates 216. It should be appreciated that other apparatus and methods for securing the toolbar 10 in the work position may be used in other embodiments. For example, the latch plates 250 may include a spring-loaded hook portion allowing the kingpins 512 to enter the pivot plates 216 but preventing them from withdrawing until the latch plates are rotated to disengage the kingpin latches 212.

As best illustrated in FIGS. 3A and 3B, saddle 510 extends rearward of center bar 520 and preferably includes mounting structure for towing a trailing cart such as that disclosed in U.S. Pat. No. 5,485,797.

Figure 6A:
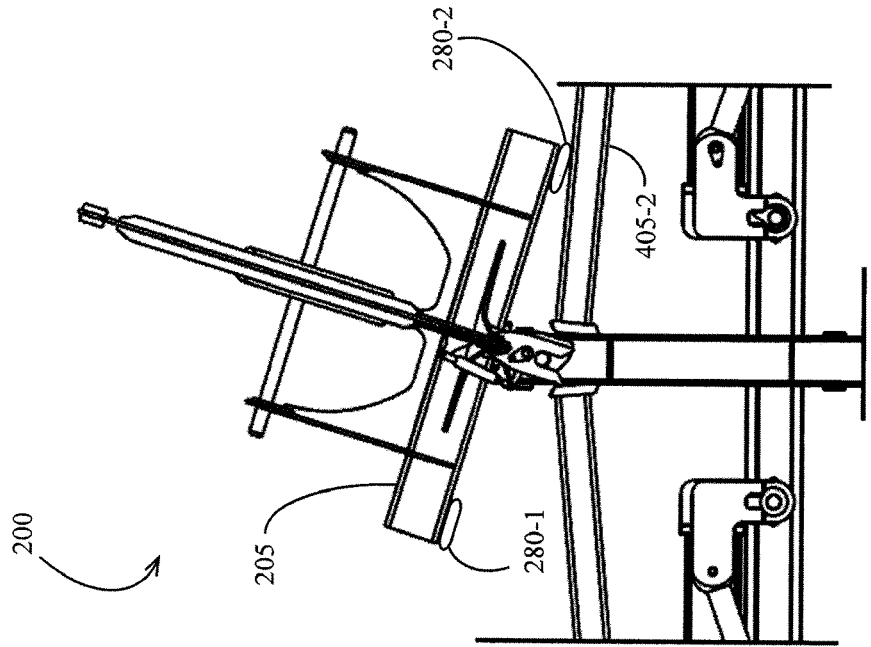
FIG. 6A is partial top view of the toolbar of FIG. 1A in a left-turn work position.
Figure 6B:
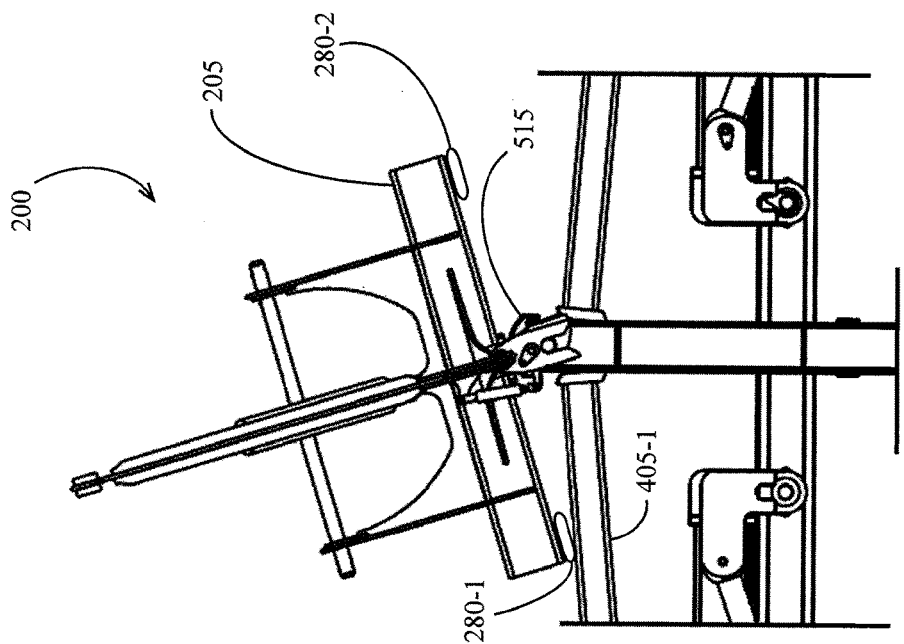
FIG. 6B is a partial top view of the toolbar of FIG. 1A in a right-turn work position.

As best illustrated in FIGS. 6A and 6B, the work hitch 300 preferably allows the frame 400 to pivot about the kingpins 512 while in the work position. Turning to FIG. 3B, in the work position, pintle hitch 250 and lunette ring 492 are disengaged such that horizontal forces are primarily imparted from the mount 200 to the frame 400 through the kingpins 512. Thus when latched in the work position, upper kingpin 512-1 and lower kingpin 512-2 define a generally vertical axis of rotation about which the mount 200 and frame 400 may pivot relative to one another during operation. Thus although the mount 200 is integrally mounted to the tractor, the tractor may turn about a certain minimum radius without turning the frame 400. Returning to FIGS. 6A and 6B, it should be appreciated that if the tractor turns about the minimum radius, the torque tube 205 (described herein with respect to FIG. 4A) will contact one of the inboard draft bars 405. Thus in a preferred embodiment, either the inboard draft bars 405 or the torque tube 205 are provided with resilient stops 280 as illustrated in FIGS. 6A and 6B. The stops 280 may comprise pads made of resilient material such as rubber, or may comprise any apparatus configured to prevent damage to the toolbar 10. It should be appreciated that in other embodiments, the torque tube may be shortened horizontally in order to allow the tractor to turn freely about smaller radii.

Figure 4B:
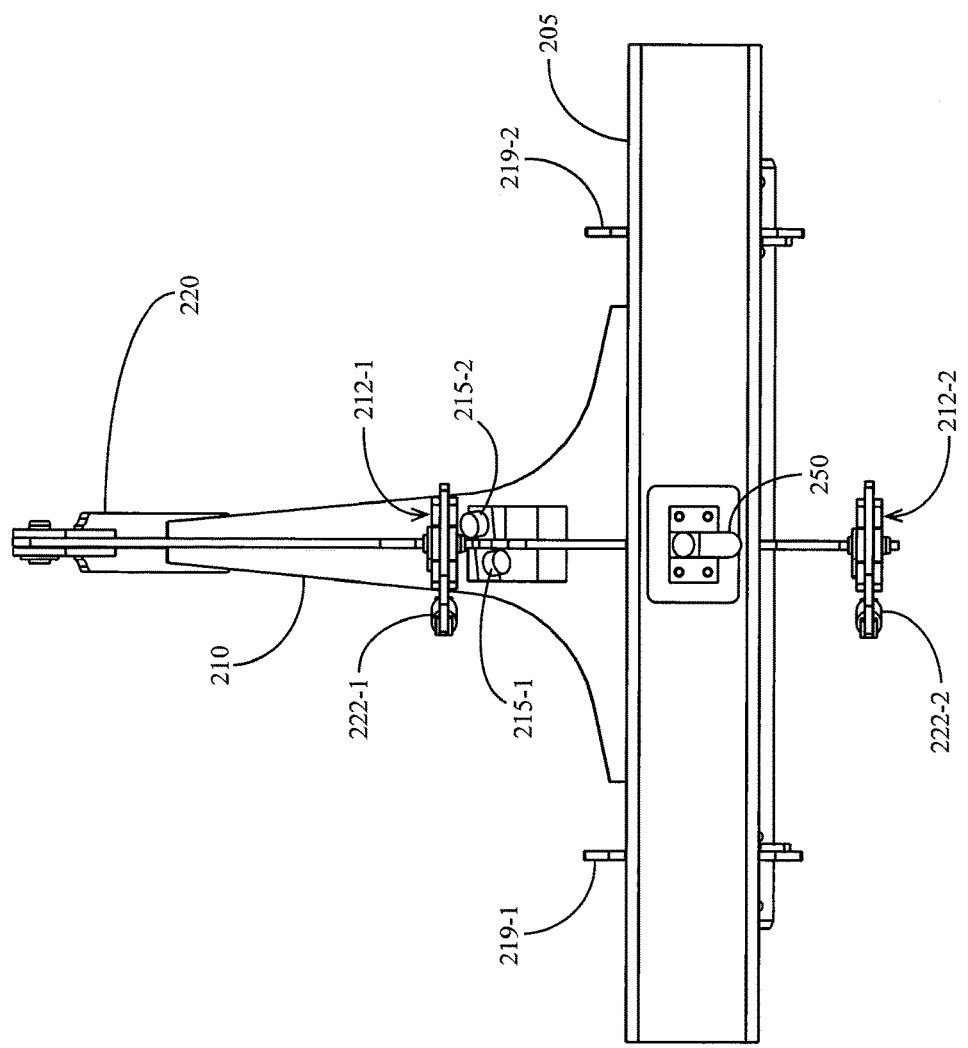
FIG. 4B is a rear elevation view of the toolbar mount of FIG. 4A.
Figure 4C:
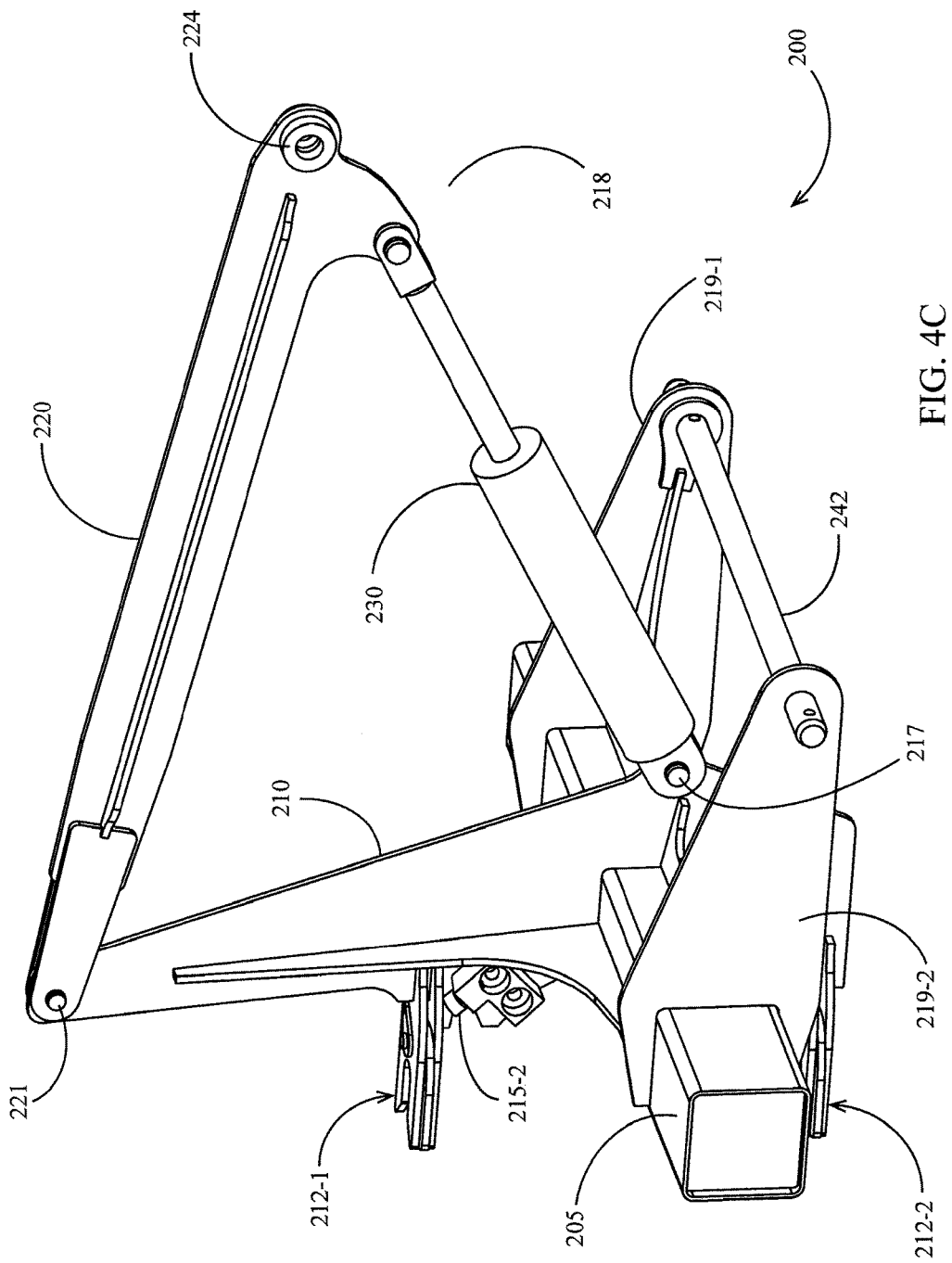
FIG. 4C is a generally forward perspective view of the toolbar mount of FIG. 4A.

The work hitch 300 preferably transfers vertical loads from the mount 200 to the folding frame 400 and thus to the tools mounted to the center bar 520 and wing sections 410. Returning to FIGS. 3A and 3B, saddle 510 includes a weight transfer plate 515 having upper and lower chamfered edges. When the toolbar 10 reconfigures the work position, the plate 515 passes between two thrust rollers 215 (best viewed in FIG. 4B) pivotally mounted to the mount 200. A lower thrust roller 215-1 is preferably disposed to rollingly contact the lower chamfered surface of the plate 515. An upper thrust roller 215-2 is preferably disposed to rollingly contact the upper chamfered surface of the plate 515. The upper and lower chamfered surfaces of the plate 515 preferably lie 45 degrees from a vertical axis, while the upper and lower thrust rollers 515 are preferably angularly offset by 90 degrees. It should be appreciated that other configurations of the plate and thrust rollers would also allow transmission of vertical loads between the mount 200 and the frame 400.

Net downward forces imposed on the mount 200 may be imparted to the frame 400 through the contact surface between the upper thrust roller 215-2 and the upper chamfered surface of the plate 515. Net upward forces imposed on the mount 200 may be imparted to the frame 400 through the contact surface between the lower thrust roller 215-1 and the lower chamfered surface of the plate 515.

As best viewed in FIG. 2A, the chamfered surfaces of the weight transfer plate 515 are preferably curved about a rearward generally vertical axis. Thus when the toolbar 10 is in the work position, the mount 200 may rotate about the kingpins 512 (e.g., to the positions shown in FIGS. 6A and 6B) while the plate 515 remains disposed between the upper and lower thrust rollers 215.

Mount

The mount 200 is illustrated in further detail in FIGS. 3B and 4A-4C. Pintle hitch 250 is mounted to a torque tube 205. Side plates 219 are mounted in transversely spaced apart relation to the torque tube 205. A hitch bar 242 is mounted to the side plates 219. A mast 210 is mounted to the torque tube 205, preferably disposed between and substantially equidistant from the side plates 219. Thrust rollers 215, kingpin latches 212, and actuators 222 are coupled to mast 210, which extends both above and below the torque tube 205. A top link 220 is pivotally coupled to mast 210 at a joint 221. A mount cylinder 230 is pivotally coupled at a first end to the mast 210 at a joint 217. Mount cylinder 230 is pivotally coupled at a second end to the top link 220 at a joint 218. Mount cylinder 230 is preferably a dual-acting hydraulic cylinder. It should be appreciated in light of the instant disclosure that the mount cylinder 230 comprises a weight transfer actuator operable to transfer weight between the tractor and the toolbar 10. Put otherwise, the mount cylinder 230 transmits vertical forces between the tractor and the toolbar 10.

Figure 7A:
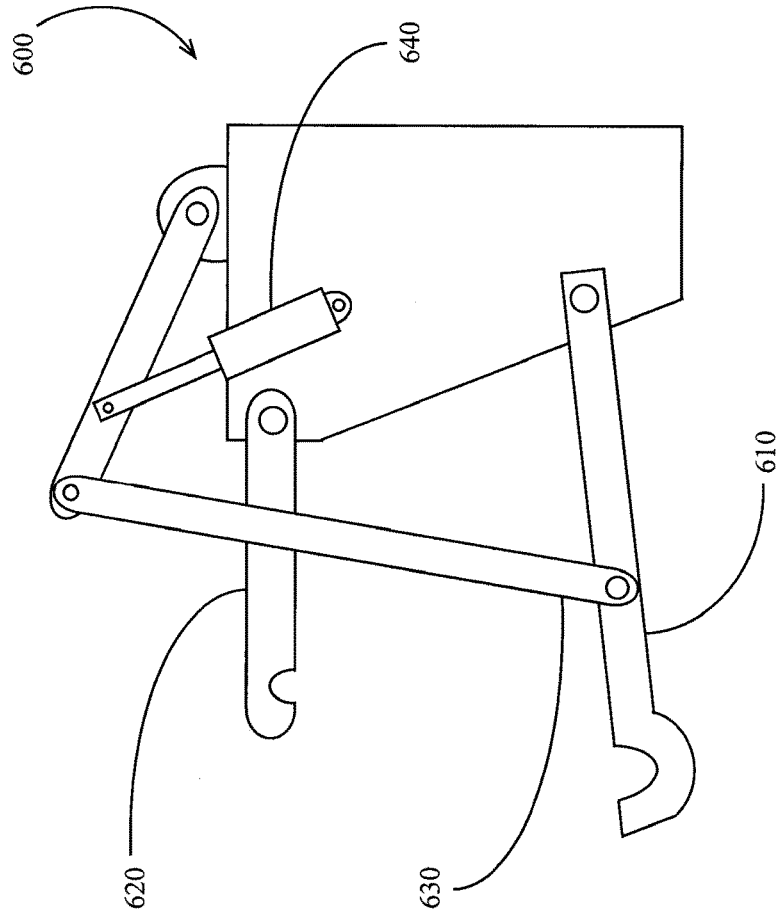
FIG. 7A is a side elevation view of a conventional three-point hitch.
Figure 7B:
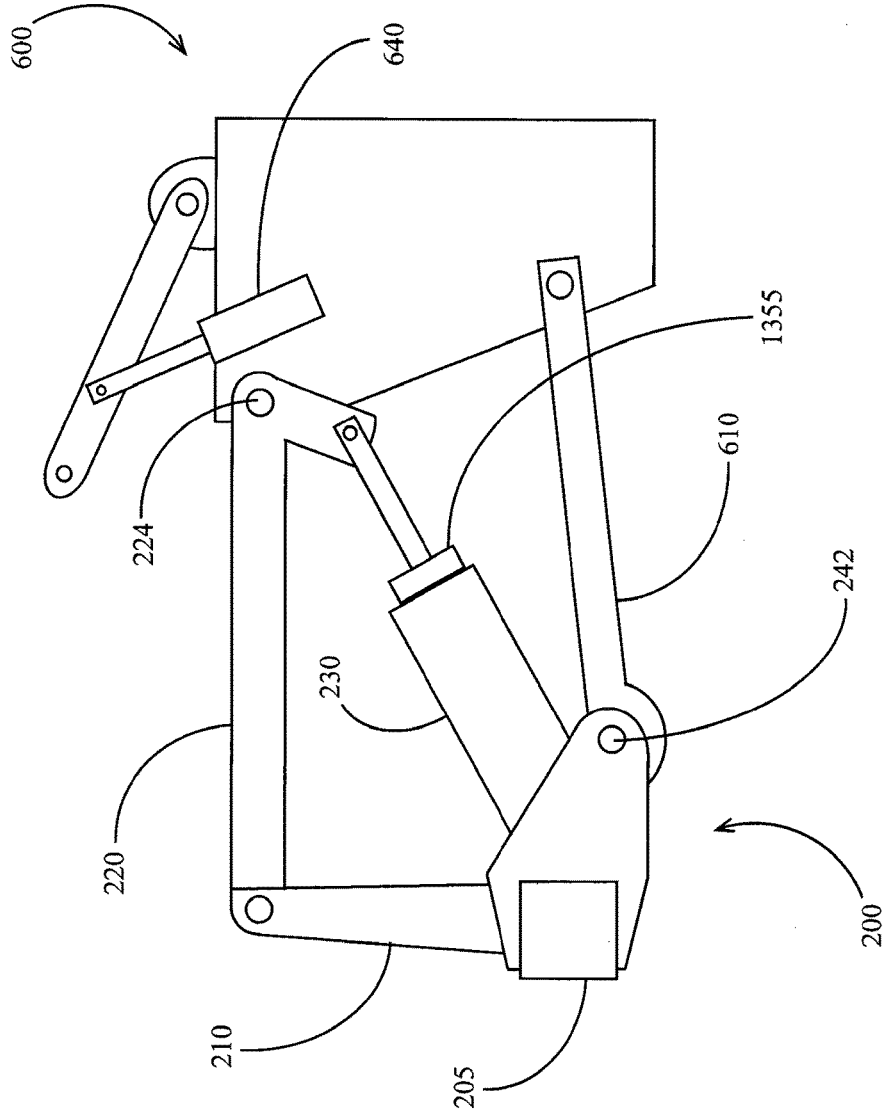
FIG. 7B is a side elevation view of a toolbar mount in combination with a modified three-point hitch.

The mount 200 is preferably configured to be mounted to a three-point hitch. A prior art three-point hitch 600, similar to that described in U.S. Pat. No. 7,861,794, the disclosure of which is hereby incorporated herein in its entirety by reference, is illustrated in FIG. 7A. The hitch 600 includes a pair of transversely spaced draft links 610, a top link 620 disposed centrally above the draft links, a pair of struts 630 and associated draft link cylinders 640 configured to raise and lower the draft links. The combination of the mount 200 and the hitch 600 is illustrated in FIG. 7B. To attach mount 200 to hitch 600, the top link 620 is preferably removed and the top link 220 is attached at a joint 224. Struts 630 are preferably disengaged from draft links 610 and preferably removed. Draft links 610 are then pivotally coupled to hitch bar 242.

In operation, the mount cylinder 230 may be retracted to raise the toolbar 10 relative to the tractor, or extended to lower the toolbar relative to the tractor.

Transport Latches

In a preferred embodiment illustrated in FIG. 10, the toolbar 10 includes transport latches 480 to selectively hold the toolbar in the transport position. Transport latch 480 includes a notched plate 413 pivotally mounted to outboard draft bar 415 at a pin 414. An actuator 416, preferably a dual-acting hydraulic cylinder, is mounted to the wing section 410 and pivotally coupled to notched plate 413. In operation, the actuator 416 is actuated to raise and lower the notched plate 413 to selectively engage a pin 411 mounted to the wing section 410. When the notched plate 413 is lowered to engage the pin 411, the wing section 410 and outboard draft bar 415 are prevented from pivoting away from one another, holding the folding frame 400 in the transport position. In the illustrated embodiment, each transport latch 480 selectively latches outboard draft bar 415 to wing section 410, but it should be appreciated that similar embodiments of latch 480 could selectively hold the toolbar in the transport position, for example by latching inboard draft bar 405 to the wing section 410, by latching inboard draft bar 405-1 to inboard draft bar 405-2, or by latching outboard draft bar 415-1 to outboard draft bar 415-2.

Tools

Figure 14:
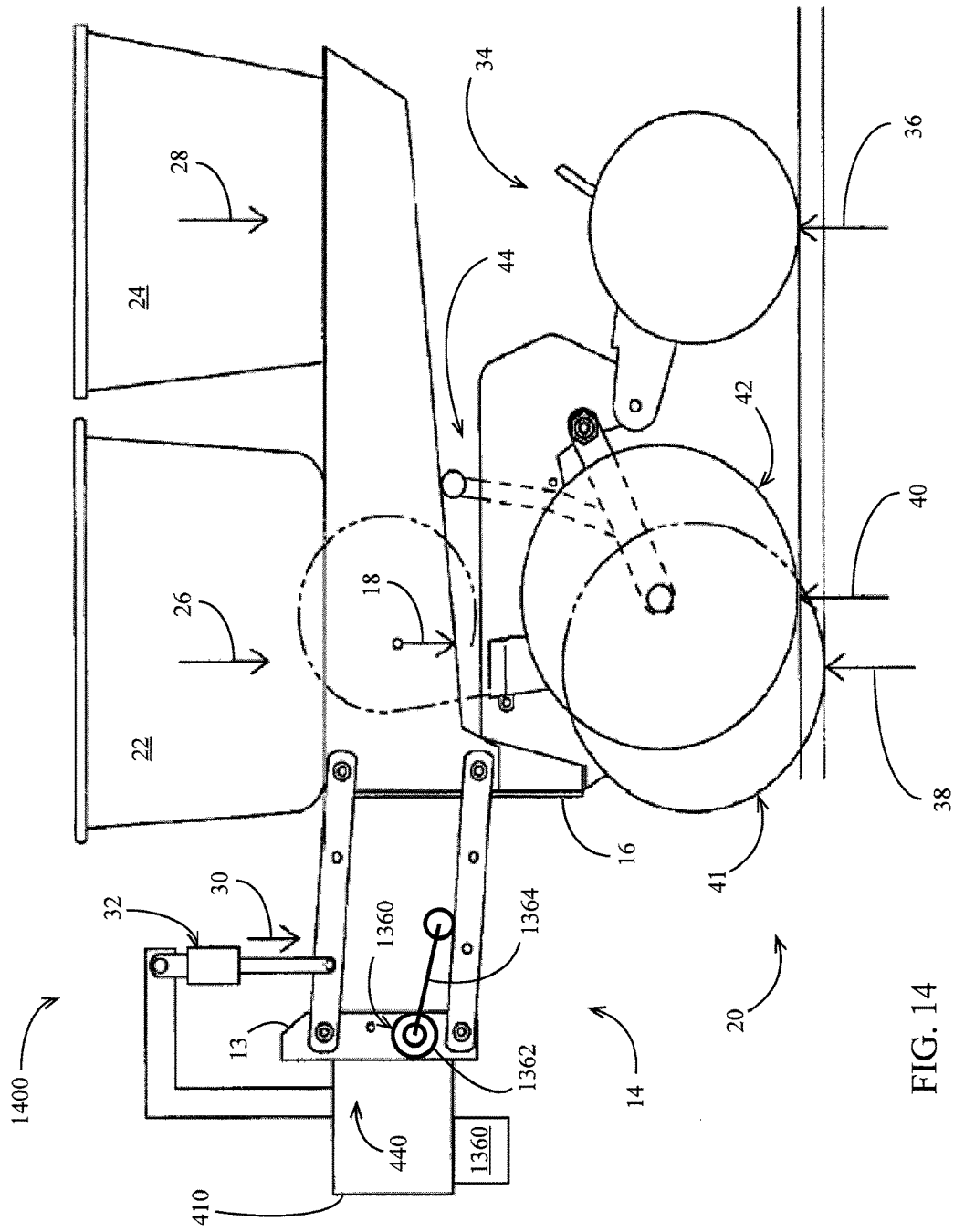
FIG. 14 is a side elevation view of an embodiment of a planter row unit.

As described elsewhere herein, the tools mounted to toolbar 10 may comprise planter row units. One such embodiment is illustrated in FIG. 14, in which a planter row unit 1400 is mounted to wing section 410 by a mounting bracket 13 installed to mounting hole arrangements 440 (FIG. 5B). It should be appreciated that similar row units may be mounted to center bar 520.

Row unit 1400 is supported from the planter frame or toolbar 10 by a parallel arm linkage 14 extending between the wing section 410 and the row unit frame 16. A dead load indicated by arrow 18 represents the dead load of the entire row unit, including the mass of an opener disk assembly 20 (including opener discs 41 and gauge wheels 42), the frame 16, a seed hopper 22, an insecticide hopper 24, a seed meter and seed tube, and the mass of any other attachments or devices supported by the row unit frame 16. In addition, live loads corresponding to the mass of the seed and insecticide stored within the hoppers 22,24 are represented by arrows 26 and 28, respectively.

A supplemental downforce 30 is also shown acting on the parallel arms 14. The supplemental downforce 30 acts in a manner to either increase or decrease the total or overall downforce on the row unit. The supplemental down force 30 is preferably applied by tool downforce actuator 32. To achieve a static load balance, the dead load 18, the live loads 26,28 and the supplemental downforce 30 are resisted by the reactionary forces exerted by the soil against the opener disk (opener disk load 38), the gauge wheels (the gauge wheel load 40) and closing wheels 34 (the closing wheel load 36).

As is well understood by those of ordinary skill in the art, a depth adjustment mechanism 44 is used to set the relative distance between the bottom of the opener disks 41 and the bottom surface of the gauge wheels 42, thereby establishing the depth of penetration of the opener disks 41 into the soil surface.

Toolbar Control System—Overview

Figure 13:
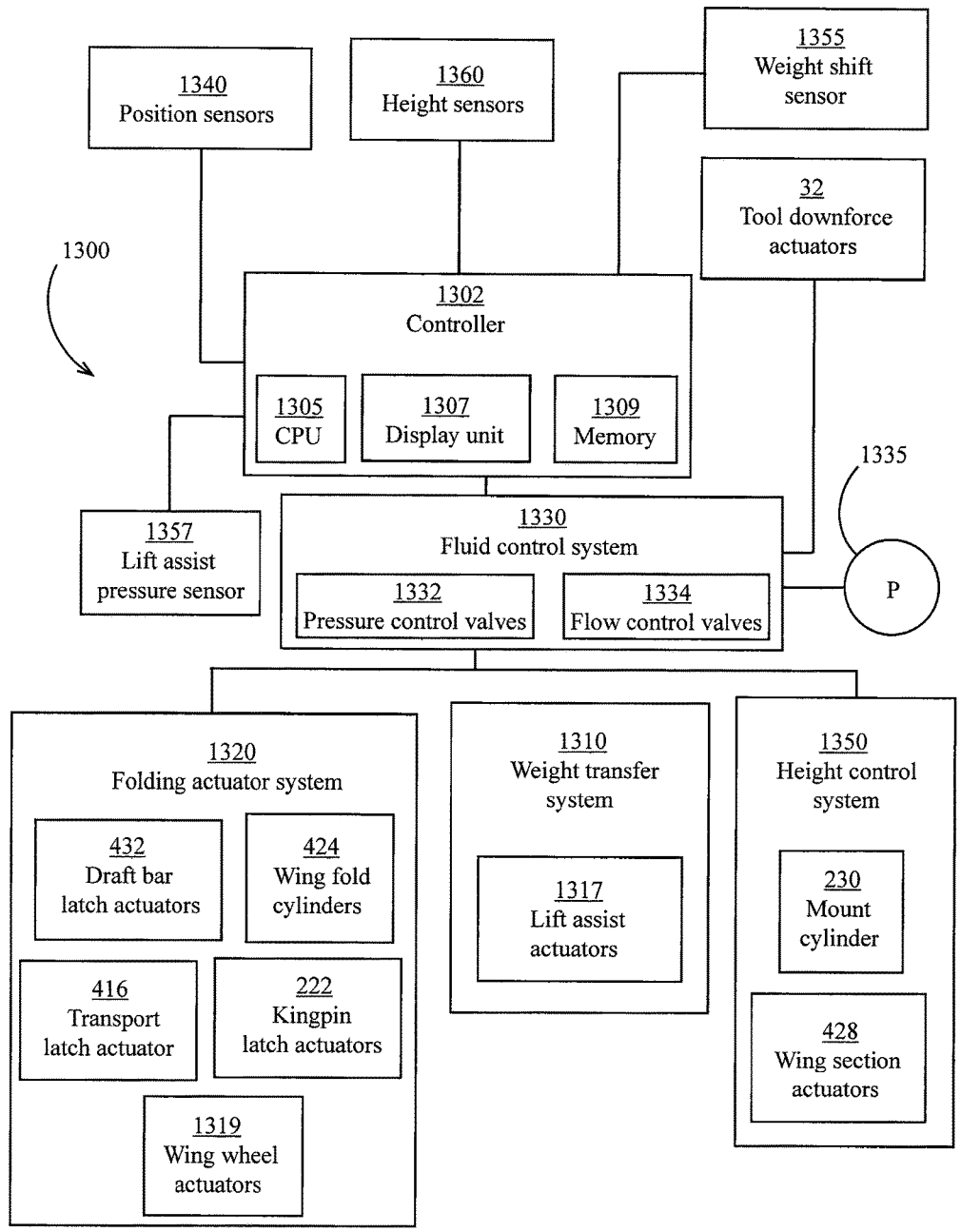
FIG. 13 schematically illustrates an embodiment of a toolbar control system.

A control system 1300 for controlling the toolbar 10 is illustrated in FIG. 13. The control system 1300 preferably includes a controller 1302, a fluid control system 1330, a folding actuator system 1320, a weight transfer system 1310, a fluid power source 1335, an array of position sensors 1340, a height control system 1350, a weight transfer sensor 1355 (FIG. 15), an array of tool downforce actuators 32, and an array of height sensors 1360 (FIG. 14).

The controller 1302 is preferably in electrical communication with fluid control system 1330. Fluid control system 1330 is in fluid communication with fluid power source 1335, folding actuator system 1320, weight transfer system 1310, height control system 1350 and tool downforce actuators 32. Position sensors 1340 are preferably in electrical communication with the controller 1302. Height sensors 1360 are preferably in electrical communication with the controller 1302. The weight transfer sensor 1355 is preferably in electrical communication with the controller 1302.

Toolbar Control System—Controller

The controller 1302 preferably includes a CPU 1305, a memory 1309 and a display unit 1307 having a graphical user interface allowing a user to view information and enter commands. In a preferred embodiment, the controller 1302 is an implement monitor such as that disclosed in Applicant's co-pending U.S. patent application Ser. No. 13/292,384, the disclosure of which is hereby incorporated herein in its entirety by reference.

Toolbar Control System—Tool Downforce Actuators

Each tool downforce actuator 32 (FIG. 14) is preferably configured to increase or decrease the vertical force between the toolbar 10 and a ground-engaging tool attached to toolbar 10.

In operation, the controller 1302 sends an individual command to the fluid control system 1330 in order to apply a desired vertical force between each row unit 1400 and the toolbar 10. It should be appreciated that due to differences in soil conditions and other factors, the desired and commanded vertical force may vary between tools and the vertical force applied to each tool may vary over time.

Toolbar Control System—Inputs

Each height sensor 1360 is preferably configured to generate an electrical signal related to the height of a ground-engaging tool relative to the toolbar 10. Referring to FIG. 14, the height sensor 1360 may comprise a rotary potentiometer 1362 attached to a planter row unit 1400. The potentiometer 1362 is preferably coupled to a follower arm 1364 configured to rollingly contact an upper surface of a parallel arm 14 and preferably biased downward against the parallel arm. Thus as the row unit 1400 moves up and down relative to the toolbar 10, the follower arm moves, causing a variation in an electrical signal generated by the potentiometer 1362. In other embodiments, other suitable devices monitor the relative vertical position of the row unit 1400 and toolbar 10. For example, a string potentiometer could be mounted to row unit 1400 having a string attached to a parallel arm 14. In another embodiment, a position sensor such as an LVDT displacement transducer could be incorporated with one or more tool downforce actuators 32; the length of the tool downforce actuator 32 may then be used to determine the angle of the parallel arms 14 relative to the toolbar 10. In still other embodiments, as also illustrated in FIG. 14, a height sensor 1360 mounted to the toolbar 10 (e.g., to wing section 410) may comprise a proximity sensor disposed to measure the distance between the toolbar and the ground at the lateral position of the height sensor.

The signal from each height sensor 1360 is related to the ground-relative height of the portion of the toolbar 10 to which the row unit incorporating the height sensor is mounted. (In embodiments where a suitable height sensor is coupled directly to the toolbar, the signal is related to the portion of the toolbar to which the height sensor is coupled.) A height sensor 1360 may be incorporated in every row unit 1400 mounted to toolbar 10. To accomplish the height control method described herein with respect to FIG. 18, it is beneficial to incorporate a height sensor 1360 on at least one row unit mounted to center bar 520 and on each at least one row unit mounted to each wing section 410 because the wing sections 410 may flex relative to the center bar. However, it is preferable to have multiple height sensors 1360 on each section of the bar (e.g., center bar 520 and each wing section 410) due to potential variation in soil topography transverse to the direction of travel. For example, if a single height sensor 1360 is used at the midpoint of wing section 410, the system may fail to detect a significant rise in soil elevation at the distal end of wing section 410. In the most common variations in soil topography encountered during field working operations, the outboard end of one wing section encounters an area, often near the edge of a field. Put otherwise, it is relatively rare for the toolbar to encounter a topographical feature that affects only the height of the center bar or the inboard ends of the wing sections. Thus where a single height sensor 1360 is incorporated with a wing section row unit, it is preferably located near the distal end of the wing section.

As described herein with respect to FIG. 14, the tool downforce actuator may comprise a cylinder configured to supply a supplemental downforce 30 from toolbar 10 to a planter row unit 1400. In such an embodiment, the commanded supplemental downforce 30 comprises an input to the toolbar control system 1300 representing the vertical force transmitted between toolbar 10 and row unit 1400.

Figure 7C:
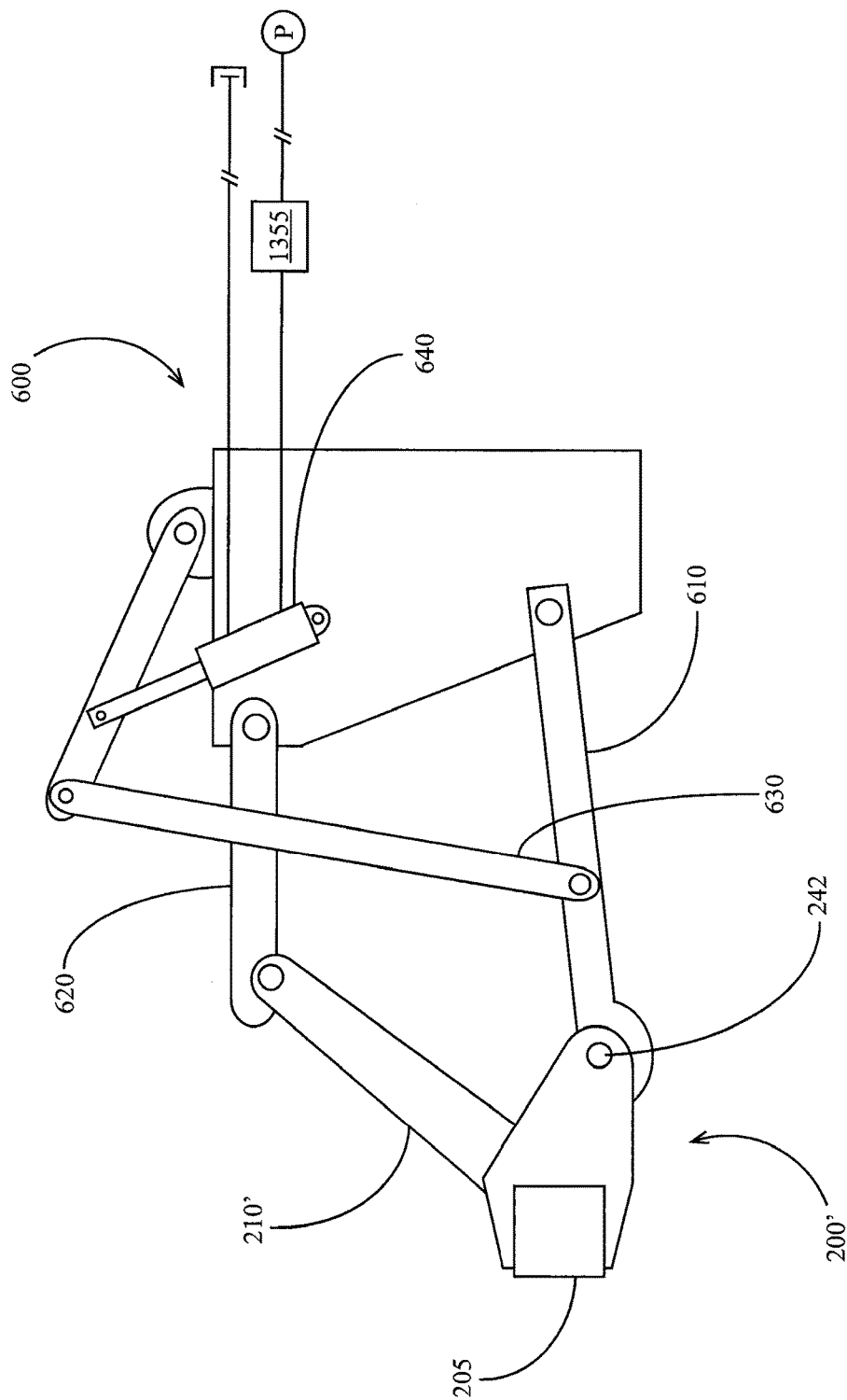
FIG. 7C is a side elevation view of a modified toolbar mount in combination with a three-point hitch of FIG. 7A.
Figure 15:
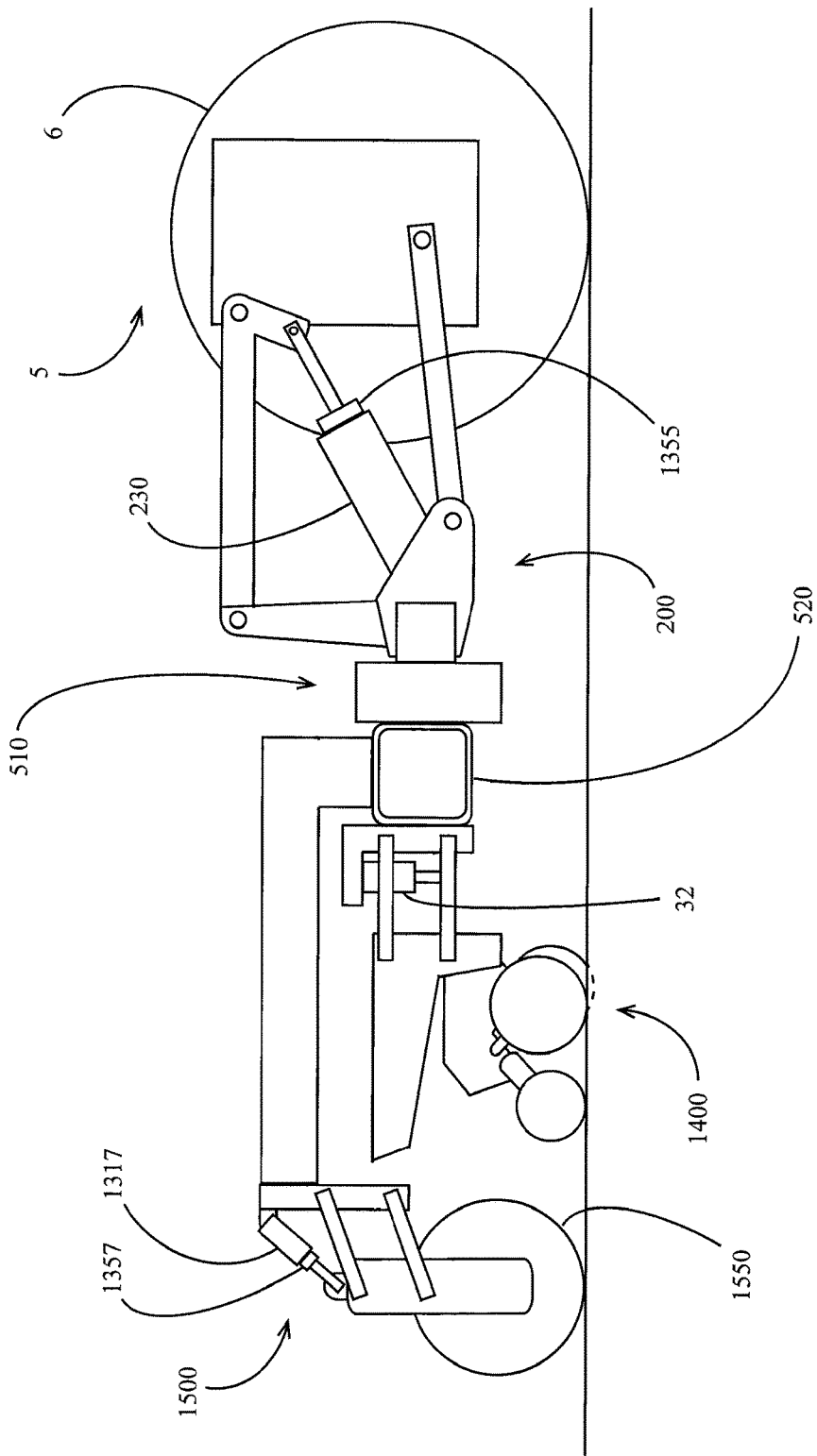
FIG. 15 is a schematic illustration of a side elevation view of a portion of a tractor and an embodiment of a planting implement including a planter row unit and a lift assist wheel.

In the embodiment illustrated in FIG. 15, the weight transfer sensor 1355 is preferably a suitable pressure sensor configured to measure the pressure in mount cylinder 230. In some of such embodiments, the weight transfer sensor 1355 comprises a hydraulic pressure transducer such as those manufactured by Link Engineering in Plymouth, Mich. The mount cylinder pressure comprises an input to the toolbar control system 1300 related to the vertical force transmitted between the tractor and the toolbar 10. In other embodiments, the weight transfer sensor 1355 comprises a strain gauge mounted to the hitch 200 at a location bearing the stress resulting from weight transfer between the tractor and the toolbar (e.g., on the top link 220). As illustrated in FIG. 7C, in some toolbar embodiments in which the toolbar is integrally mounted to the three-point hitch by a modified hitch 200', the weight transfer sensor 1355 is preferably a fluid pressure sensor configured to generate a signal related to the pressure in the draft link cylinders 640. In such embodiments, the weight transfer sensor 1355 is preferably in fluid communication with at least one of the draft link cylinders 640. As described elsewhere herein, the weight transfer sensor 1355 is preferably in electrical communication with the controller 1302 for communicating a signal related to the pressure in draft link cylinders 640.

The position sensors 1340 may comprise any suitable set of devices for determining the current position of the toolbar 10. In one embodiment, the position sensors 1340 may comprise external linear displacement transducers incorporating Hall-effect sensors (such Model No. SLH100 available from Penny & Giles in City of Industry, California) configured to generate an electrical signal related to the position of an actuator. Such sensors may be incorporated in the wing fold cylinders 424, mount cylinder 230, and wing section actuator 428, as well as other actuators described herein. The controller 1302 may use position sensors 1340 to determine whether the toolbar 10 is in specified configurations appropriate for engaging and disengaging the latches described herein. It should be appreciated that in some embodiments, the position sensors 1340 are eliminated and the operator enters commands to the controller 1302 indicating when the toolbar 10 is in such configurations.

Toolbar Control System—Outputs

The folding actuator system 1320 includes the draft tube latch actuators 432, wing fold cylinders 424, transport latch actuators 416, kingpin latch actuators 212, and wing wheel actuators 1319 configured to raise or lower one or more wing wheels.

The weight transfer system 1310 includes lift assist actuators 1317 (FIG. 15) configured to raise or lower one or more lift assist wheel assemblies 1500 attached to the toolbar.

The height control system 1350 includes the mount cylinder 230 and wing section actuators 428.

Folding Methods

Figure 11:
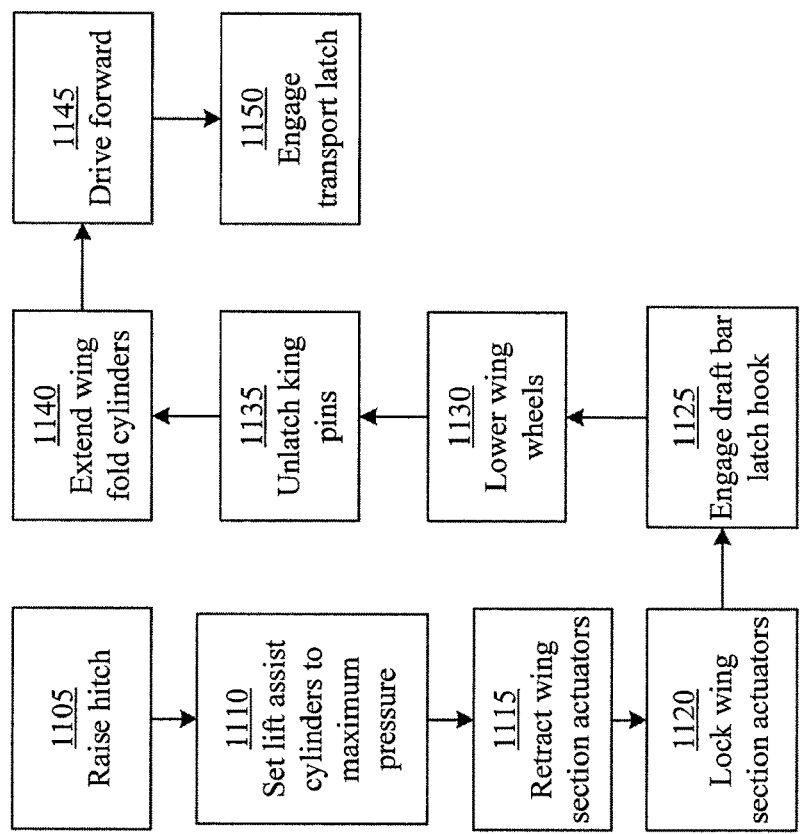
FIG. 11 illustrates an embodiment of a process for folding a toolbar from a work position to a transport position.

In operation, the toolbar 10 preferably reconfigures from the work position to the transport position according to a process illustrated in FIG. 11. At step 1105, the mount cylinder 230 is preferably fully retracted to raise the toolbar 10. At step 1110, lift assist actuators 1317 are preferably set to a maximum or high pressure such that the lift assist wheels 1550 (FIG. 15) firmly engage the soil. At step 1115, the wing section actuators 428 are fully retracted to bring wing sections 410 in parallel relation with center bar 520. At step 1120, the wing section actuators 428 are preferably locked in the fully retracted state using suitable cylinder locking mechanisms such as those incorporated in the hydraulic lock-on-retract self-locking cylinders available from PFA, Inc. in Germantown, Wis. At step 1125, the draft bar latch actuators 432 are retracted to latch the draft bars 405,415. At step 1130 the wing wheel actuators 1319 are extended such that the wing wheels firmly engage the soil. At step 1135, the kingpin latch actuators 222 are extended to disengage the kingpin latches 212, freeing the kingpins 512 and allowing the rear section 500 to be moved backward relative to the mount 200. At step 1140, the wing fold cylinders 424 are extended, folding the wing sections 410 and draft bars 405,415 toward substantial alignment along a direction parallel to the direction of travel. At step 1145, the operator may drive the tractor forward to simultaneously assist the folding process of step 1140, but the operator may also leave the tractor in place or simply allow it to roll as needed during step 1140. At step 1150, once the wing fold cylinders 424 are fully extended and the folding frame is in the transport position, the transport latch actuator 416 is preferably retracted to engage transport latch 480, retaining the folding frame in the transport position.

Figure 12:
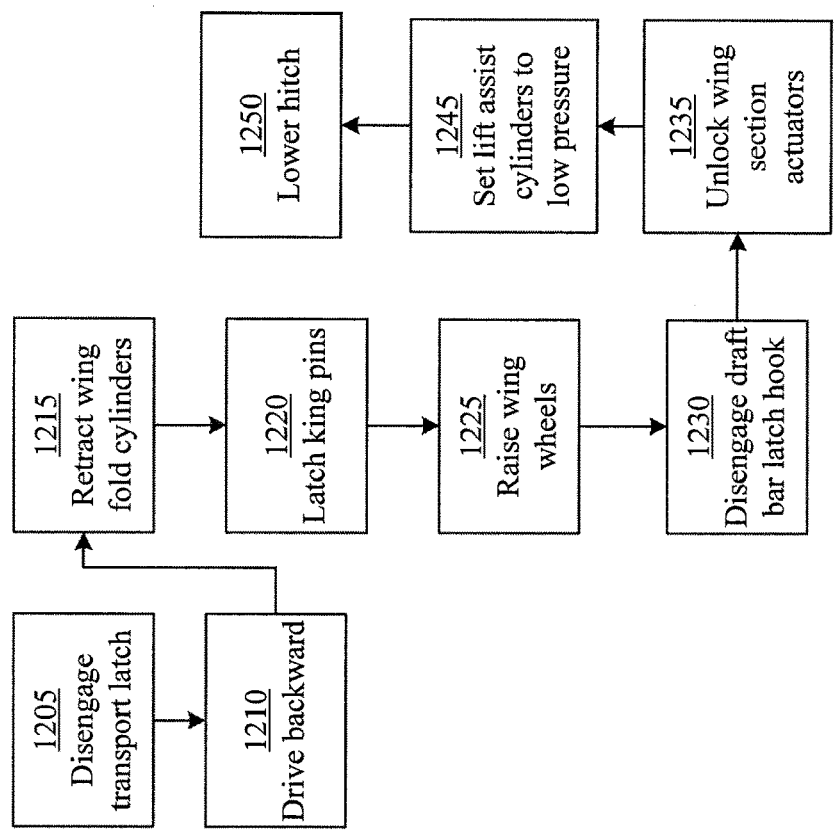
FIG. 12 illustrates an embodiment of a process for folding a toolbar from a transport position to a work position.

In operation, the toolbar 10 preferably reconfigures from the transport position to the work position according to a process illustrated in FIG. 12. At step 1205, the transport latch actuator 416 is extended to disengage transport latch 480, freeing the wing sections 410 and the draft bars 405,415 to pivot relative to one another in a substantially horizontal plane. At step 1210, the operator may optionally begin to drive the tractor backward but may also keep the tractor in place or allow the tractor to roll as needed. At step 1215, the wing fold cylinders 424 are retracted, folding the wing sections 41 and draft bars 405,415 toward substantial alignment along a direction transverse to the direction of travel. At step 1220, once the kingpins 512 are situated within kingpin latches 212, the kingpin latch actuators 222 are retracted, engaging the kingpin latches to hold the rear section 500 in place and retain the folding frame 400 in the work position. At step 1225, the wing wheel actuators 1319 are preferably retracted, raising the wing wheels off the ground. At step 1230, the draft bar latch actuators 432 are extended to unlatch the draft bars 405,415. A step 1235, wing section actuators 428 are unlocked, allowing wing sections 410 to pivot relative to center bar 520 in a substantially vertical plane. At step 1245, lift assist actuators 1317 are preferably set to a low pressure. At step 1250, the mount cylinder 230 is extended from its retracted position, lowering the toolbar 10 into the work position.

Height Control Methods

Where planter row units 1400 (FIG. 14) are used in conjunction with toolbar 10, it is desirable to maintain a constant height of toolbar 10 relative to the soil such that the parallel arms 14 are substantially parallel to the ground in order to improve the smoothness of the row unit ride as the planter traverses the field, thereby improving seed placement accuracy. In operation, such height control may be accomplished using the height control system 1350 (FIG. 13) and height sensors 1360. Using toolbar 10 as an exemplary frame embodiment, the height of the center bar 520 and wing sections 410 relative to the ground may be separately controlled to account for variations in soil topography.

Figure 18:
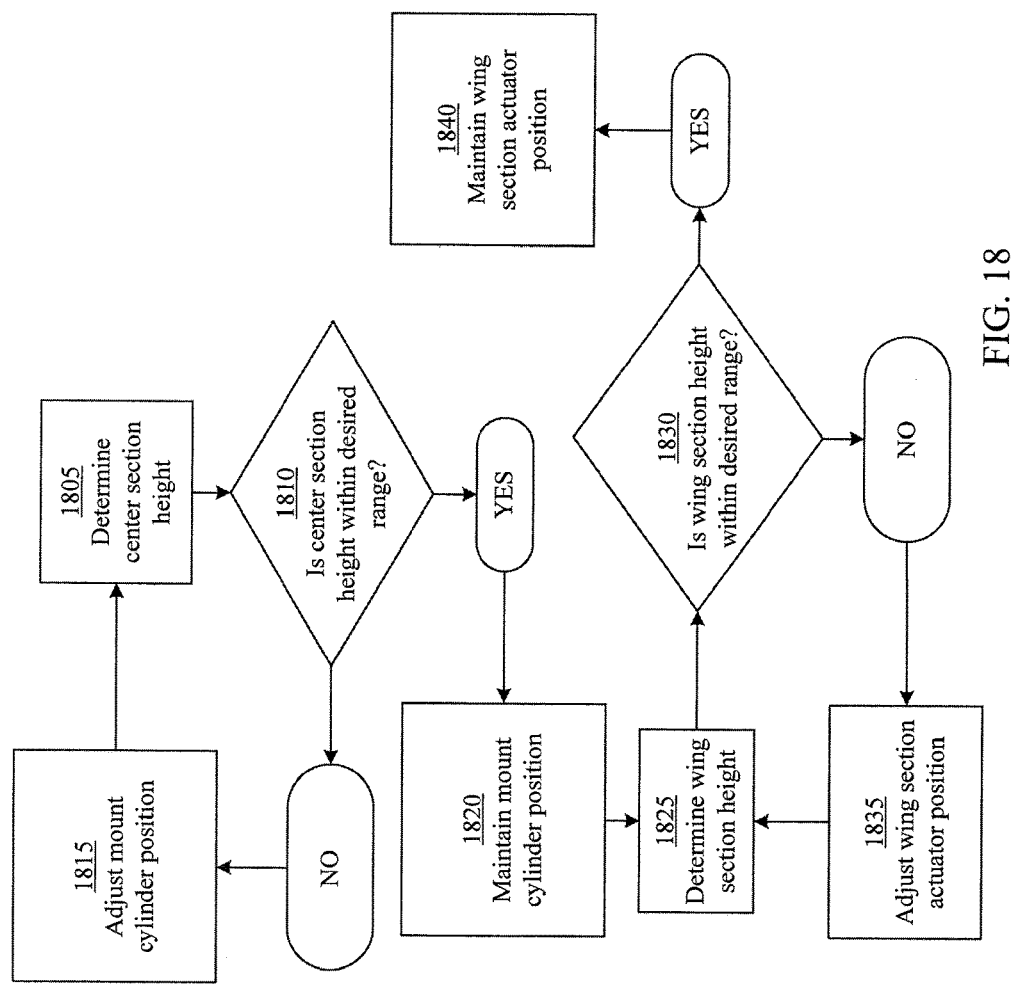
FIG. 18 illustrates an embodiment of a process for controlling the height of a toolbar.

One such height control method is illustrated in FIG. 18. At step 1805, the height of center bar 520 is determined using height sensor 1360 incorporated in a row unit 1400 mounted to the center bar 520. At step 1810, the controller 1302 determines whether the center bar height is within a desired range. If it is not, at step 1815 the controller 1302 commands an adjustment in mount cylinder position tending to bring the center bar height within the desired range. For example, in the embodiment illustrated in FIG. 15, if the height of center bar 520 was too low relative to the soil, the mount cylinder 230 would preferably retract in order to raise the center bar. In order to accomplish this step, the fluid control system 1330 preferably controls the mount cylinder 230 in a flow control mode (e.g., using a flow control valve 1334 incorporated in the fluid control system 1330). Thus the fluid control system 1330 is operable to control the position (i.e., the degree of extension) of the mount cylinder 230. If the system determines that the center bar is at the desired height, then at step 1820 the toolbar control system maintains the mount cylinder position and determines the wing section height at step 1825. As with the center bar, the height of each wing section 410 relative to the ground is preferably determined using the signal from a height sensor 1360 incorporated in a row unit on the wing section. At step 1830, the controller 1302 determines whether the heights of the wing sections 410 are within a desired range. If they are not, wing section actuators 428 are then used to adjust the height of wing sections 410 at step 1835. Once the wing sections 410 are within the desired range, the controller 1302 maintains the position of wing section actuators 428 at step 1840.

Because the height of row units along each wing section 410 (and to a lesser extent along the center bar 520) may vary at any given time, there may exist situations in which the toolbar may be insufficiently articulated to bring all instrumented row units (i.e., those having height sensors 1360) within the desired height range. Thus according to a modified height control method, a bar section height average is determined (e.g., wing section height average at step 1830) by averaging the height determined for multiple row units along a section. The section height is then corrected (e.g., at step 1835) in order to bring the section height average within a desired range. This method has the additional advantage of reducing the frequency of height adjustment.

Figure 22:
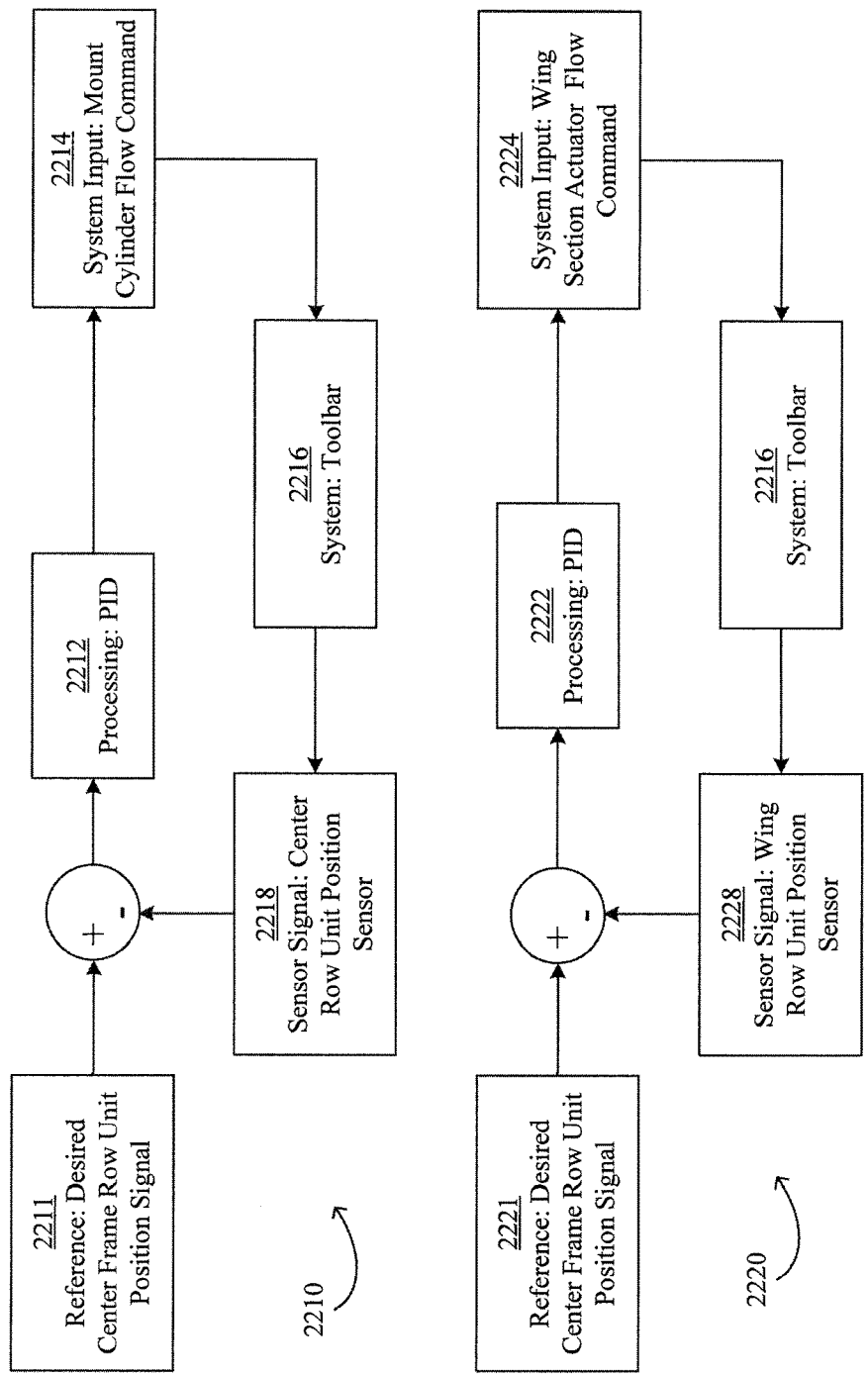
FIG. 22 illustrates an embodiment of a center section height control loop and an embodiment of a wing section height control loop.

In some embodiments, the method illustrated in FIG. 18 is modified such that the center sections and wing sections are controlled independently. One such embodiment is illustrated in FIG. 22, which illustrate a center section height control loop 2210 for controlling the height of center bar 520 and an independent wing section height control loop 2220 for controlling the height one of the wing sections 410. It should be appreciated that a second wing section control system similar to wing section control system 2220 preferably controls the height of the opposite wing section 410.

Turning to the center section height control system loop of FIG. 22, the reference 2211 preferably corresponds to a desired center section height, e.g., the desired signal from one or more height sensors 1360 associated with one or more row units on the center section. The error between the reference 2211 and a sensor signal 2218, e.g., the actual signal from one or more height sensors 1360 associated with one or more row units on the center section, is processed at a signal processing step 2212 to determine an input signal 2214. The processing step 2212 is preferably performed by the controller 1302 and preferably comprises proportional-integral-derivative processing steps known in the art to ensure timely correction while avoiding overcorrection. The input signal 2214 is commanded to the fluid control system 1330, which introduces a corresponding flow into the system 2216, specifically into the mount cylinder 230 of toolbar 10. The resulting sensor signal 2218 is again compared to the reference 2211.

Turning to the wing section height control system loop of FIG. 22, the reference 2221 preferably corresponds to a desired wing section height, e.g., the desired signal from one or more height sensors 1360 associated with one or more row units on the wing section. The error between the reference 2221 and a sensor signal 2228, e.g., the actual signal from one or more height sensors 1360 associated with one or more row units on the wing section, is processed at a signal processing step 2222 to determine an input signal 2224. The processing step 2222 is preferably performed by the controller 1302 and preferably comprises proportional-integral-derivative processing steps known in the art to ensure timely correction while avoiding overcorrection. The input signal 2224 is commanded to the fluid control system 1330, which introduces a corresponding flow into the system 2216, specifically into the wing section actuator 428 of toolbar 10. The resulting sensor signal 2228 is again compared to the reference 2221.

Figure 23:
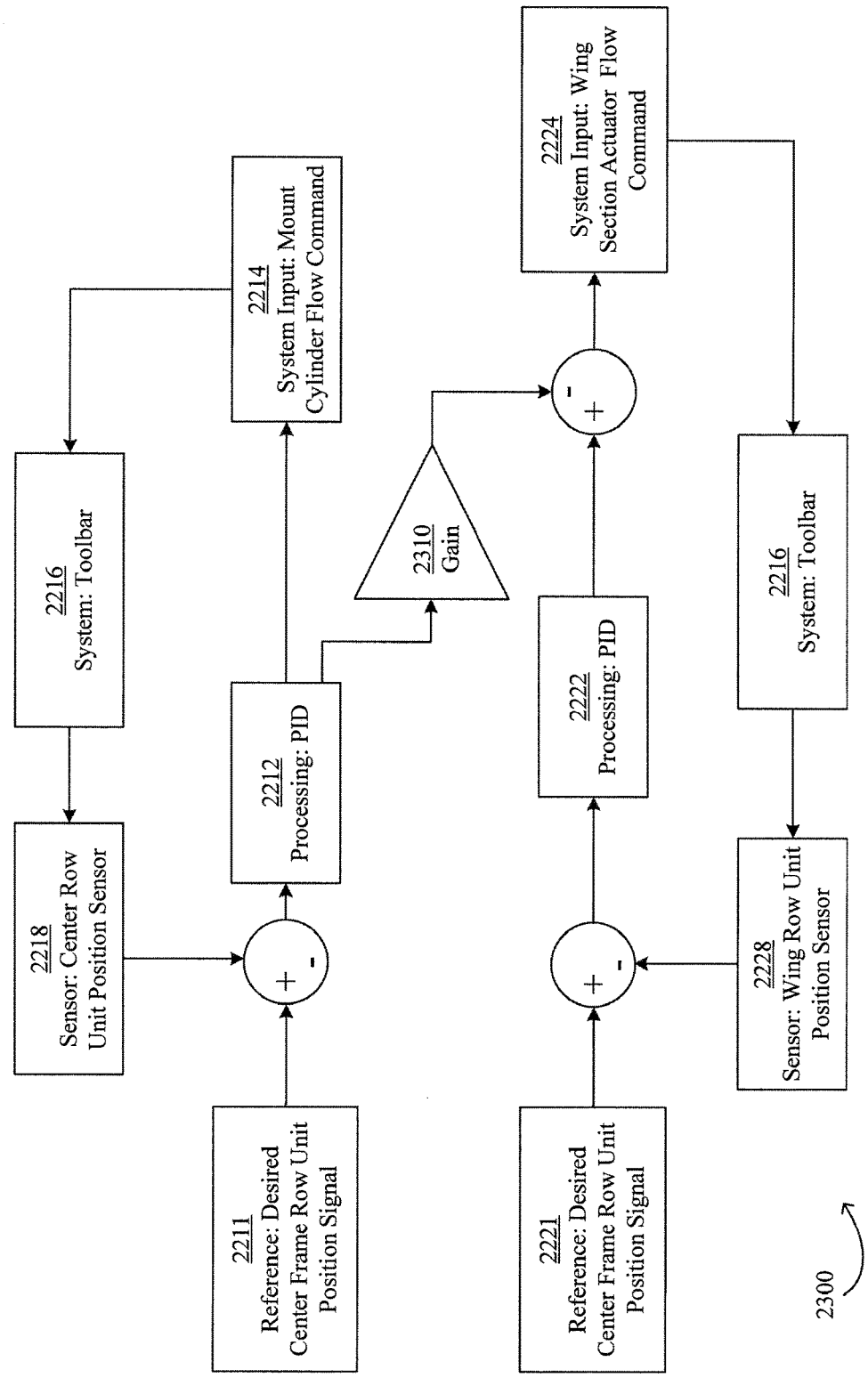
FIG. 23 illustrates an embodiment of a combined height control loop for a center section and a wing section.

Because changes to the center section height necessarily change the wing section height, the processed center section height error is preferably "fed forward" to the wing section height control loop. As illustrated in the combined control loop 2300 of FIG. 23, a gain 2310 is preferably applied to the processed center section height error. The gain 2310 preferably corresponds to the difference in diameter between the wing section actuator 428 and the mount cylinder 230. The gained error is then preferably subtracted from the processed wing section height error before the wing section actuator flow command is determined. Thus the combined control loop 2300 determines a wing section actuator flow command based in part on the error in the center section height. This "feed-forward" method results in faster system response and avoids redundant or undesirable commands to the wing section actuators 428. For example, if the center section and both wing sections are all 2 centimeters higher than desired, the control loop 2300 preferably lowers the center section without substantially adjusting the position of wing section actuators 428.

According to another preferred height control method illustrated in FIG. 21, the controller 1302 determines all three section height averages at step 2105, compares all three section height averages to a desired range at step 2107, consults a look-up table at step 2110 to determine a prescribed action, and then takes the prescribed action at step 2115. Such a look-up table 2000 is illustrated in FIG. 20. The look-up table 2000 includes a set of scenarios 2100 based on the section height average of each section of toolbar 10. In the illustrated lookup table, a section average is marked as "Good" if the row units are at the desired position relative to the toolbar, "High" if the row units are too high relative to the toolbar, and "Low" if the row units are too low relative to the toolbar. A preferred action set 2200 corresponds to each scenario. A stop condition set 2250 preferably corresponds to each scenario. The controller 1302 determines whether the stop condition has been met at step 2120; once the stop condition has been met, the controller stops the prescribed action at step 2125.

Figure 19A:
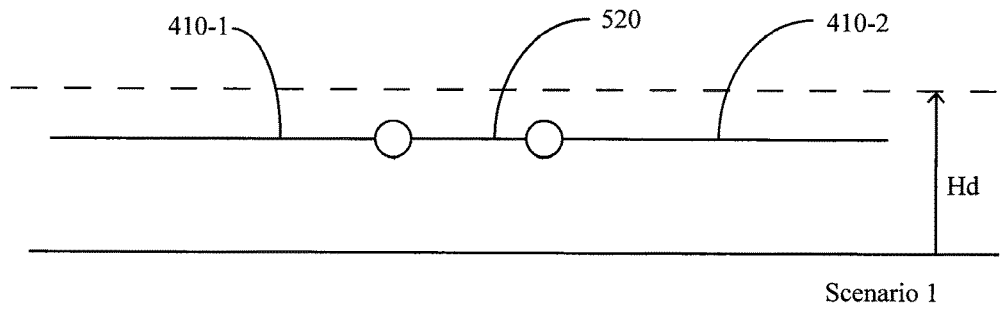
FIG. 19A schematically illustrates a toolbar height control scenario.
Figure 19B:
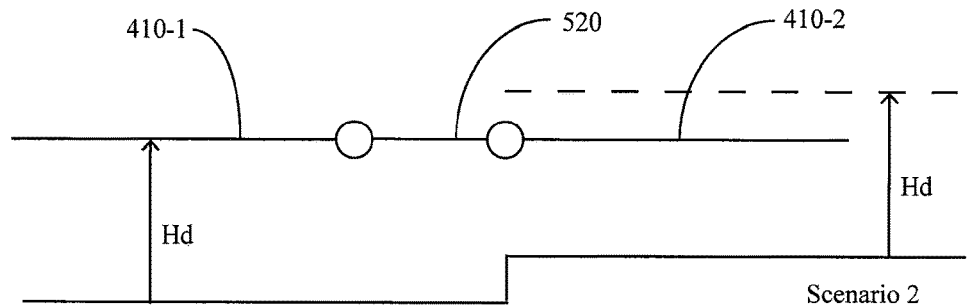
FIG. 19B schematically illustrates another toolbar height control scenario.
Figure 19C:
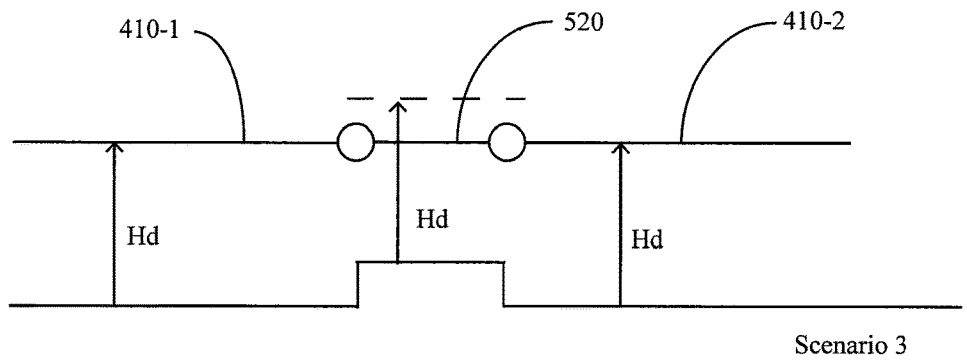
FIG. 19C schematically illustrates another toolbar height control scenario.

The first three scenarios listed in the top three rows of lookup table 2000 are schematically illustrated in FIG. 19A-19C, respectively. In FIG. 19A, all three sections of toolbar 10 are too close to the soil such that the average height of the row units on each section is higher than the desired height Hd. Thus the desired toolbar height Hd is best achieved by retracting the mount cylinder 230 to raise center bar 520 as prescribed in scenario 1 of lookup table 2000. In FIG. 19B, only the right wing section 410-2 is too close to the soil such that the average height of the row units on the right wing section is too high. Thus the desired toolbar height Hd is best achieved by retracting the right cylinder to raise the right wing section as prescribed in scenario 2 of lookup table 2000. In FIG. 19C, only the center bar 520 is too close to the soil such that the average height of row units on the center section is too high. Thus the desired toolbar height Hd is best achieved by retracting the mount cylinder.

Weight Transfer Methods

In the embodiment of toolbar 10 illustrated in FIG. 15, the weight imposed on the soil during operation is imposed by the lift assist wheels 1550, ground-working tools 1400, and tires 6 of the tractor 5. In order to perform ground-working operations such as opening a furrow for planting seeds, toolbar 10 requires a certain amount of weight to properly penetrate the soil. However, empirical evidence has shown that agronomic benefit may result from having the minimum weight possible on the toolbar due to reduced soil compaction. Moreover, the weight of the tractor 5 on the soil has detrimental agronomic effects whose severity depends in part on whether the tractor is carried by tires or by track treads (which spread out the load on the soil across a larger contact area). In addition, empirical evidence has shown that the additional agronomic damage caused by a second soil-compacting wheel pass is less (per applied pound) than that caused by a first pass.

Thus depending on the circumstances, it may be desirable to shift weight from the toolbar 10 to the tractor 5 in order to reduce the excess weight between the toolbar and the ground. However, in other circumstances (e.g., where the toolbar 10 does not have sufficient weight to perform ground-working operation), it may be desirable to shift weight from the tractor 5 to the toolbar.

Figure 24:
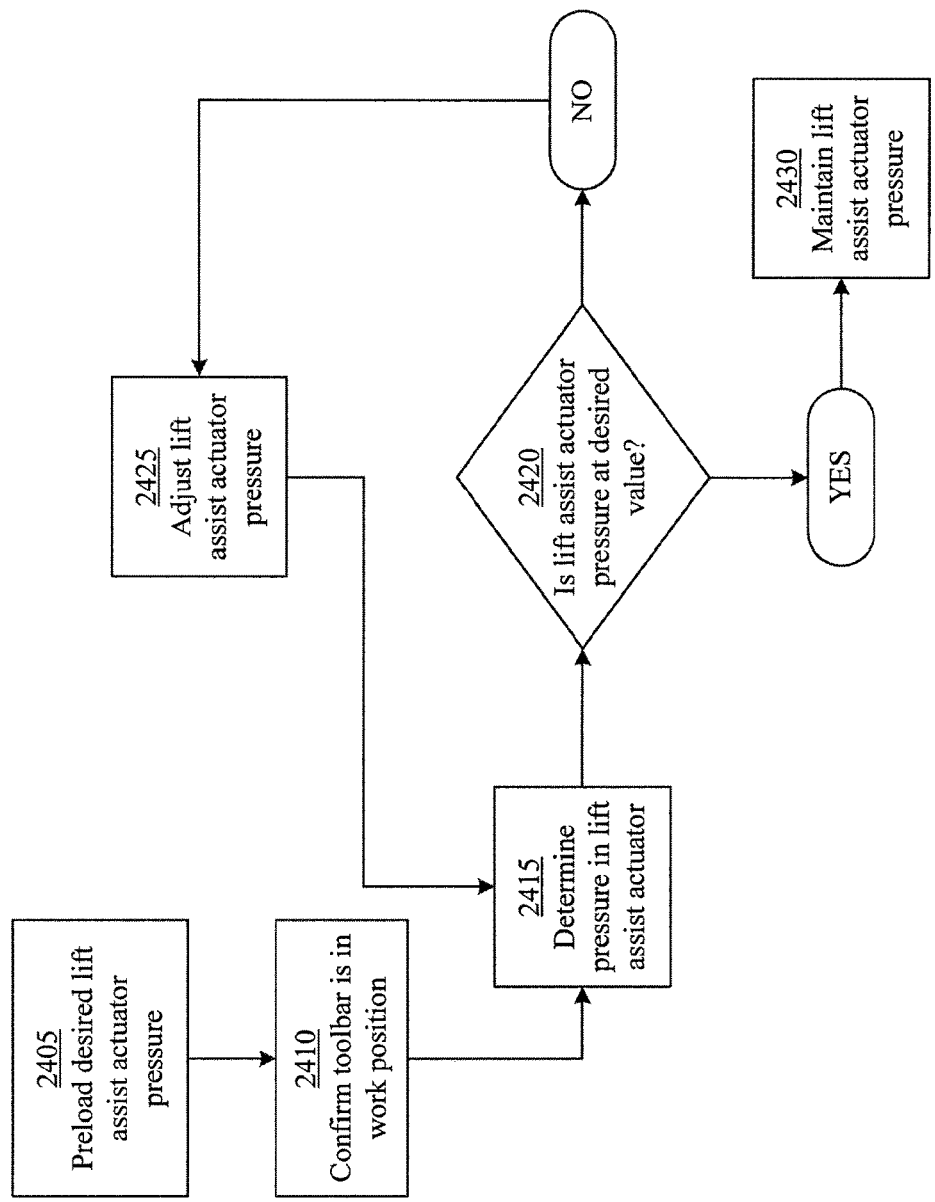
FIG. 24 illustrates another embodiment of a process for transferring weight between a tractor and a toolbar.

According to weight transfer methods such as that illustrated in FIG. 24, the toolbar control system 1300 maintains a constant pre-determined pressure in lift assist actuators 1317 when the toolbar is in the planting configuration. At step 2405, a desired lift assist actuator pressure is stored in the memory 1309 of the controller 1302. Step 2405 may be performed by the manufacturer in programming the controller 1302 or may be performed by the operator using the user interface of the controller 1302. At step 2410, the controller 1302 preferably confirms whether the toolbar is in the work position, e.g., using position sensors 1340 or by determining whether the operator has instructed the toolbar to assume the work position. At step 2415, the controller 1302 determines the pressure in the lift assist actuator 1317. In some embodiments, the controller 1302 determines the lift assist actuator pressure using the pressure commanded by the fluid control system 1330 (e.g., the pressure commanded to a pressure control valve 1332, such as a pressure reducing-relieving valve, incorporated in the fluid control system 1330). In other embodiments, the controller 1302 determines the lift assist pressure using the signal from a pressure sensor 1357 associated with the lift assist actuator. As illustrated in FIG. 13, in such embodiments the pressure sensor 1357 is preferably in electronic communication with the controller 1302. At step 2420, the controller 1302 determines whether the actual lift assist actuator pressure corresponds to the desired pressure. If the values do not correspond then the controller commands an adjustment in lift assist actuator pressure at step 2425. Once the values correspond then the controller maintains the lift assist actuator pressure at step 2430.

Figure 25:
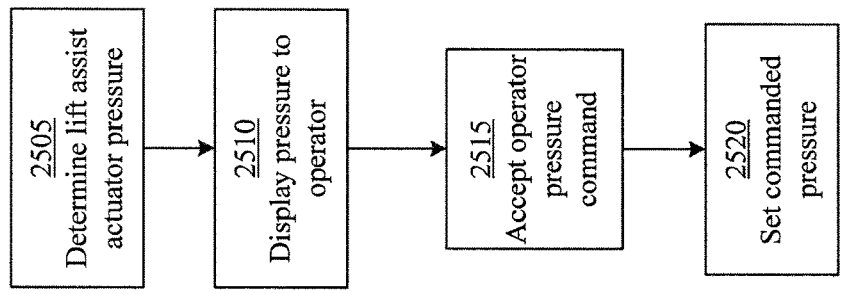
FIG. 25 illustrates another embodiment of a process for transferring weight between a tractor and a toolbar based on an operator command.

According to weight transfer methods such as that illustrated in FIG. 25, the controller 1302 displays the pressure in lift assist actuators 1317 and allows the operator to adjust the pressure in lift assist actuators 1317. At step 2505, the controller 1302 determines the lift assist actuator pressure using either the signal from a pressure sensor associated with the lift assist actuator or the current command signal used to set the pressure in the lift assist actuator. At step 2510, the controller displays the lift assist actuator pressure to the operator. At step 2515, the controller 1302 accepts a pressure command from the operator, allowing the operator to adjust the commanded lift assist actuator pressure. At step 2520, the controller sets the operator-commanded pressure in the lift assist actuator either by simply setting a command signal corresponding to a desired pressure or by adjusting the command signal until a measured pressure (e.g., as reported by pressure sensor 1357) corresponds to the desired pressure.

According to other weight transfer methods, the toolbar control system 1300 determines a weight shift representing the weight being transferred between the tractor and the toolbar, compares the actual weight shift to a desired weight shift, and adjusts the weight shift to more closely approximate the desired weight shift.

Figure 16:
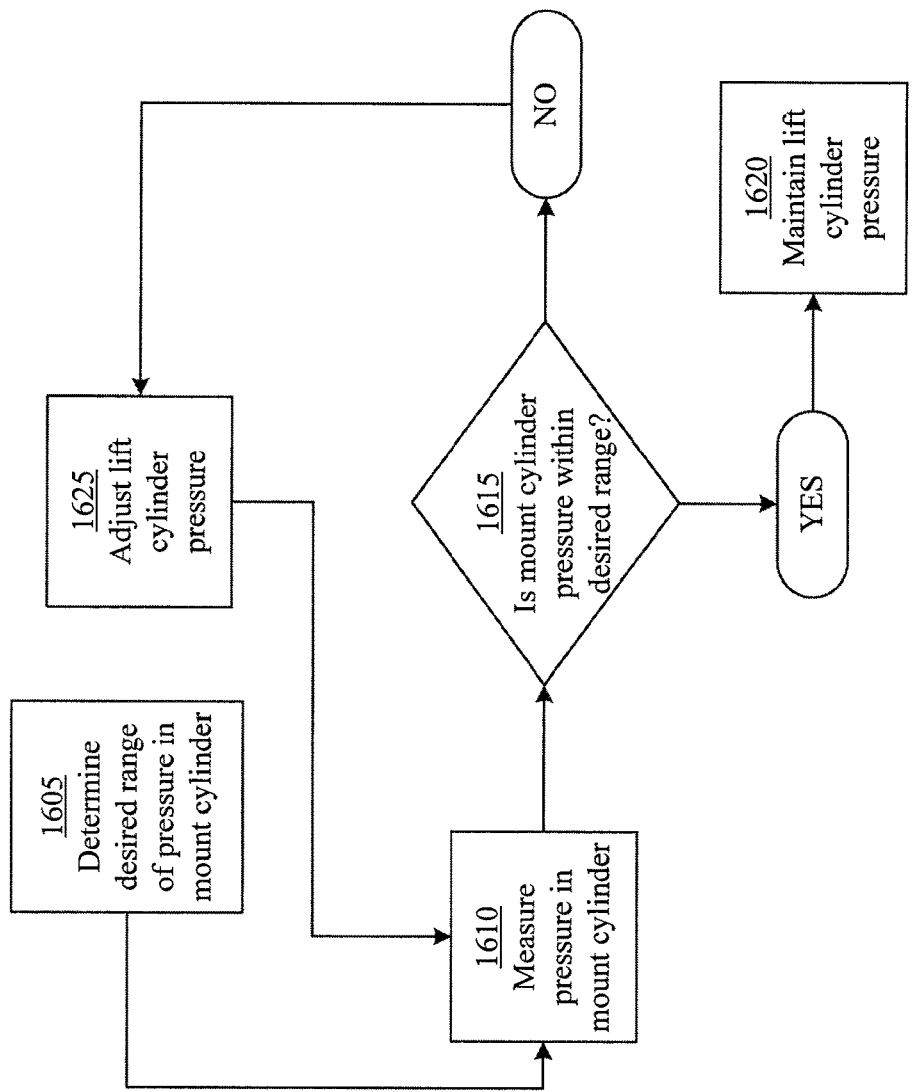
FIG. 16 illustrates an embodiment of a process for transferring weight between a tractor and a toolbar.

One such method is illustrated schematically in FIG. 16. At step 1605, the controller 1302 determines a desired range of pressure in mount cylinder 230. This range is preferably based on multiple factors including the weight, size and configuration of the tractor 5, whether the tractor 5 is carried by tires or tracks, and the weight of the toolbar 10. At step 1610, the controller 1302 obtains the current pressure in the mount cylinder 230 from the weight transfer sensor 1355. At step 1615, the controller 1302 determines whether the mount cylinder pressure is within the desired range. As best seen in FIG. 15, increasing the pressure in lift assist actuator 1317 tends to shift weight from the tractor 5 to the toolbar 10. (Saddle 510 is shown schematically in FIG. 15 for clarity, illustrating that the mount 200 is mounted integrally to the center bar 520.) Thus, if the mount cylinder pressure is outside the desired range, then at step 1625 the controller adjusts the commanded pressure in lift assist actuator 1317 in order to produce a desired change in the mount cylinder pressure. (Lift assist actuators 1317 are preferably pressure-controlled by the fluid control system 1330, e.g., using a pressure control valves 1332 such as pressure reducing-relieving valves, such that the controller 1302 may set and maintain a desired pressure in the lift assist cylinders by modifying the fluid control system.) Once the mount cylinder pressure is within the desired range, the controller 1302 maintains the lift assist cylinder pressure at step 1620.

According to another method of using toolbar 10, the weight shift between the tractor 5 and toolbar 10 may be modified based on the pressure in tool downforce actuators 32. The pressure in tool downforce actuators 32 indicates the weight being added to or removed from the toolbar 10 by the ground-working tools 10. When the tool downforce being taken from the toolbar 10 exceeds a predetermined range, it may be desirable to shift weight from the tractor 5 onto the toolbar to assist in providing sufficient downforce for ground-working operations. Likewise, when the tool weight being added to the toolbar 10 exceeds a predetermined range, it may be desirable to shift weight from the toolbar to the tractor 5 to assist in flotation of the ground-working tools and to minimize soil compaction.

Figure 17:
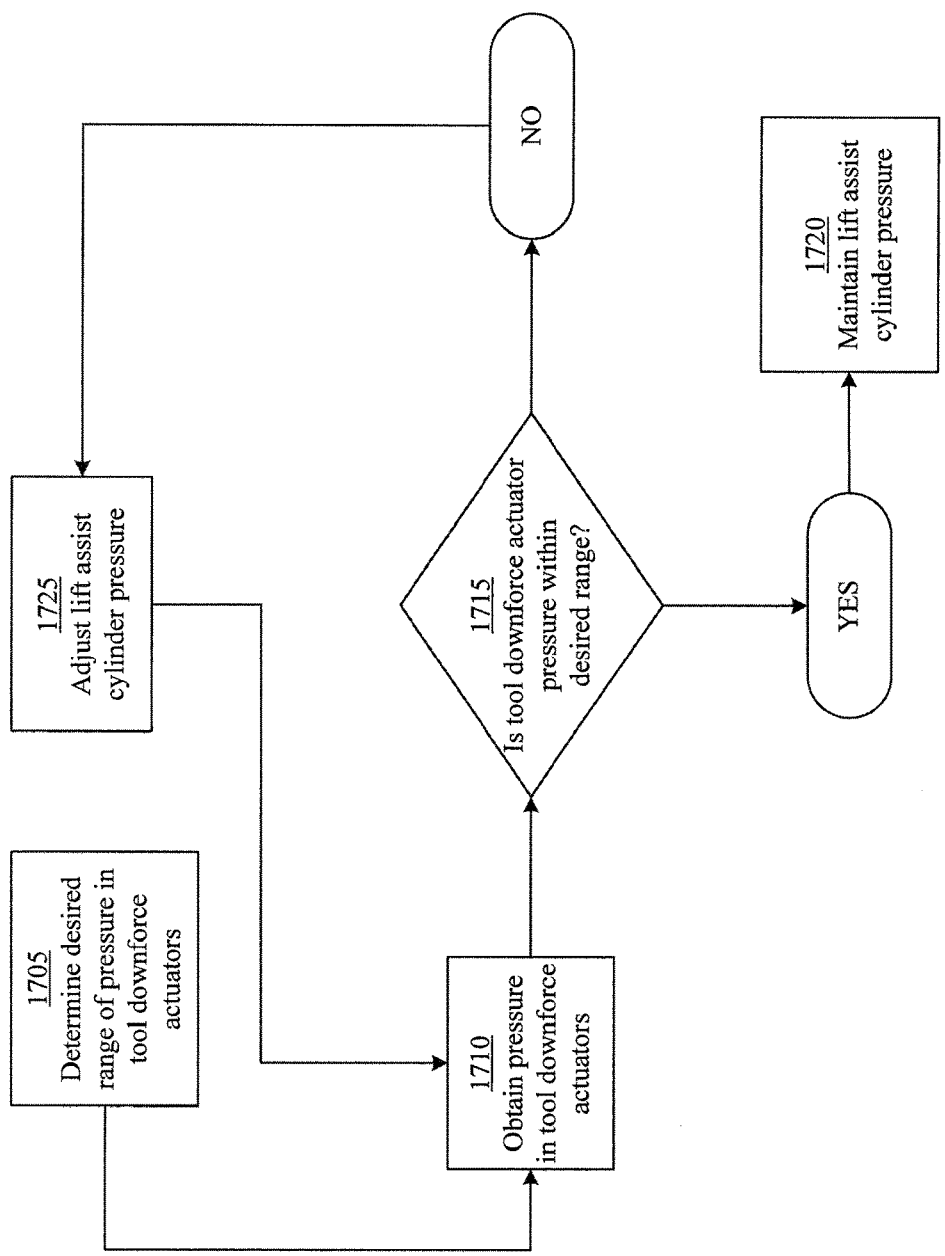
FIG. 17 illustrates another embodiment of a process for transferring weight between a tractor and a toolbar.

Such a method is illustrated in FIG. 17. At step 1705, the controller 1302 determines a desired range of pressure in tool downforce actuators 32. At step 1710, the controller 1302 obtains the current pressure commanded to the tool downforce actuators 32 by the control system 1300. At step 1715, the controller 1302 determines whether the tool downforce pressure is within the desired range. If the tool downforce pressure is outside the desired range, then at step 1725 the controller adjusts the commanded pressure in lift assist actuator 1317 in order to produce a desired change in the mount cylinder pressure. Once the tool downforce pressure is within the desired range, the controller 1302 maintains the lift assist cylinder pressure at step 1720.

The method described above with respect to FIG. 17 may preferably be used with a downforce control system such as that described in Applicant's co-pending U.S. application Ser. No. 13/014,546, the disclosure of which is hereby incorporated herein in its entirety by reference. Using such a system, the supplemental downforce applied by tool downforce actuators 32 is adjusted automatically in response to a row unit downforce measurement in order to maintain the minimum downforce necessary on each row unit 1400.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A control system for an agricultural toolbar drawn across a ground surface by a tractor, comprising:
    a wheel coupled to the toolbar and engaging the ground surface;
    an actuator having an actuator pressure, said actuator being coupled to the toolbar, said actuator being disposed to modify a ground force between said wheel and the ground surface, said ground force being related to said actuator pressure;
    a fluid control system, said fluid control system being in fluid communication with said actuator, said fluid control system being operable to bring said actuator pressure to a desired actuator pressure; and
    a controller in electrical communication with said fluid control system, wherein said controller is operable to modify said desired actuator pressure; and
    a weight transfer sensor in electronical communication with said controller, said weight transfer sensor operable to send a weight transfer signal to said controller.

2. The control system of claim 1, wherein the toolbar has a work position and a transport position, and wherein said wheel substantially supports a weight of the toolbar in the transport position.

3. The control system of claim 1, further including an electronic display in electrical communication with said controller, said electronic display being mounted in an operator station of the tractor, said electronic display being operable to display said desired actuator pressure to an operator, said electronic display being operable to receive an actuator pressure command from said operator and to set said actuator pressure command.

4. The control system of claim 1, wherein said controller stores a desired weight transfer signal value, wherein said controller is operable to modify said desired actuator pressure such that said weight transfer signal becomes closer to said desired weight transfer signal value.

5. The control system of claim 4, further including a weight transfer actuator, said weight transfer actuator being operable to transfer weight between the tractor and the toolbar, said weight transfer actuator having a weight transfer actuator pressure, wherein said weight transfer sensor comprises a pressure sensor, wherein said weight transfer signal comprises a signal related to said weight transfer actuator pressure.

6. The control system of claim 5, wherein said weight transfer actuator is in fluid communication with said fluid control system, and wherein said fluid control system is operable to control a position of said weight transfer actuator.

7. The control system of claim 6, wherein said position of said weight transfer actuator is related to a height of the toolbar relative to the tractor.

8. The control system of claim 7, wherein the toolbar includes a wing section and a center section, said wing section being pivotally mounted to said center section for pivoting relative to said center section about a generally horizontal axis, and further including a wing section actuator operable to pivot said wing section about said generally horizontal axis, wherein said wing section actuator is in fluid communication with said fluid control system, wherein said fluid control system is operable to control a position of said wing section actuator.

9. The control system of claim 4, wherein said controller stores a desired weight transfer value, further comprising:
    an electronic display in electrical communication with said controller, said electronic display being mounted in an operator station of the tractor, said electronic display being operable to display a value corresponding to said weight transfer signal to an operator, said electronic display being operable to receive a weight transfer command from said operator and modify said desired weight transfer signal value based on said weight transfer command.

10. A method of controlling an agricultural toolbar drawn across a ground surface by a tractor, comprising:
    reconfiguring the toolbar from a transport position to a work position;
    modifying a ground force between a ground-engaging wheel and the ground surface, said ground engaging wheel pivotally coupled to said toolbar;
    measuring a weight transfer value;
    storing a desired weight transfer value; and
    modifying said ground force such that said weight transfer value becomes closer to said desired weight transfer value.

11. The method of claim 10, further comprising:
    reconfiguring the toolbar from said work position to said transport position; and
    supporting a portion of a weight of said toolbar with said ground-engaging wheel in said transport position.

12. The method of claim 10, further comprising:
    displaying a value related to said ground force to an operator;
    receiving an input corresponding to said command signal from said operator; and
    modifying said ground force based on said input.

13. The method of claim 10, further comprising:
    transferring weight between the tractor and the toolbar using said weight transfer actuator, wherein said step of measuring said weight transfer value is accomplished by measuring a pressure in said weight transfer actuator.

14. The method of claim 10, further comprising:
    controlling a degree of extension of said weight transfer actuator.

15. The method of claim 14, wherein said degree of extension of said weight transfer actuator is related to a height of the toolbar relative to the tractor.

16. The method of claim 15, further comprising:
modifying an angular position of a wing section of said toolbar.

17. The method of claim 10, further comprising:
displaying a value corresponding to said weight transfer value to an operator;
receiving a command from said operator; and
modifying said weight transfer value based on said command.

* * * * *